(12) United States Patent
Suzuki

(10) Patent No.: US 7,756,476 B2
(45) Date of Patent: Jul. 13, 2010

(54) WIRELESS COMMUNICATION SYSTEM, TERMINAL, AND METHOD FOR REPORTING STATUS OF TERMINAL

(75) Inventor: Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 630 days.

(21) Appl. No.: 11/500,388

(22) Filed: Aug. 8, 2006

(65) Prior Publication Data

US 2007/0106899 A1    May 10, 2007

(30) Foreign Application Priority Data

Aug. 11, 2005    (JP)    ............................. 2005-233475

(51) Int. Cl.
*H04B 7/00* (2006.01)
(52) U.S. Cl. .................. 455/41.2; 455/435.1; 370/338; 370/352
(58) Field of Classification Search ................ 455/410, 455/411, 11.1, 13.1, 16, 434–435.3, 445, 455/450, 453; 370/312, 338, 352, 390, 469
See application file for complete search history.

(56) References Cited

U.S. PATENT DOCUMENTS

| | | | | |
|---|---|---|---|---|
| 5,757,783 | A * | 5/1998 | Eng et al. ................... | 370/315 |
| 6,307,843 | B1 * | 10/2001 | Okanoue .................... | 370/312 |
| 6,710,702 | B1 * | 3/2004 | Averbuch et al. ............ | 340/7.1 |
| 6,898,421 | B2 * | 5/2005 | Mori et al. .................. | 455/411 |
| 6,993,323 | B2 * | 1/2006 | Kamma ...................... | 455/411 |
| 6,999,717 | B2 * | 2/2006 | Spratt et al. ..................... | 455/7 |
| 7,046,992 | B2 * | 5/2006 | Wallentin et al. ........... | 455/411 |
| 2001/0006552 | A1 * | 7/2001 | Salokannel ................. | 380/272 |
| 2001/0014584 | A1 * | 8/2001 | Oshigiri ..................... | 455/3.01 |
| 2001/0022780 | A1 * | 9/2001 | Mizutani et al. ............ | 370/261 |
| 2002/0098830 | A1 * | 7/2002 | Lauper et al. ............... | 455/411 |
| 2003/0119484 | A1 * | 6/2003 | Adachi et al. .............. | 455/411 |
| 2005/0164634 | A1 * | 7/2005 | Tanaka et al. .............. | 455/41.2 |
| 2005/0195781 | A1 * | 9/2005 | Ikeda ......................... | 370/338 |
| 2005/0215234 | A1 * | 9/2005 | Fukuzawa et al. ........... | 455/411 |

FOREIGN PATENT DOCUMENTS

| | | |
|---|---|---|
| JP | 11 8625 | 1/1999 |
| JP | 2004-274193 | 9/2004 |
| JP | 2004-289815 | 10/2004 |

* cited by examiner

*Primary Examiner*—Nick Corsaro
*Assistant Examiner*—Chuong A Ngo
(74) *Attorney, Agent, or Firm*—Finnegan, Henderson, Farabow, Garrett & Dunner LLP

(57) ABSTRACT

A wireless communication system includes a plurality of terminals connected via at least one wireless network. Each of the plurality of terminals identifies a wireless network to which the terminal is to be connected by using a group identifier including a terminal identifier of an issuing terminal that issues an attribute certificate and a first identifier that is set for the issuing terminal.

10 Claims, 21 Drawing Sheets

FIG. 4

| INDEX 501 | TERMINAL IDENTIFIER 502 | OPERATION GROUP IDENTIFIER 503 | | REGISTR-ATION OPERATION MODE 506 |
|---|---|---|---|---|
| | | NETWORK IDENTIFIER | PROFILE IDENTIFIER | |
| #1 | TERMINAL C | TERMINAL A | 1 | OFF |
| #2 | TERMINAL D | TERMINAL C | 1 | OFF |
| #3 | TERMINAL B | TERMINAL B | 2 | OFF |

| INDEX | ISSUING TERMINAL GROUP IDENTIFIER | | ISSUING TERMINAL PUBLIC KEY CERTIFICATE | AUTHENTICATION GROUP IDENTIFIER | |
|---|---|---|---|---|---|
| | NETWORK IDENTIFIER | PROFILE IDENTIFIER | | NETWORK IDENTIFIER | PROFILE IDENTIFIER |
| #0 | TERMINAL B | 0 | PKC (TERMINAL B) | TERMINAL B | 0 |
| #1 | TERMINAL B | 1 | PKC (TERMINAL B) | TERMINAL B | 1 |
| #2 | TERMINAL B | 2 | PKC (TERMINAL B) | TERMINAL B | 2 |
| #3 | TERMINAL D | 1 | PKC (TERMINAL D) | TERMINAL B | 2 |

FIG. 7

| INDEX | ISSUING TERMINAL GROUP IDENTIFIER | | ATTRIBUTE CERTIFICATE |
|---|---|---|---|
| | NETWORK IDENTIFIER | PROFILE IDENTIFIER | |
| #1 | TERMINAL B | 1 | AC (TERMINAL B, TERMINAL B, 1) |
| #2 | TERMINAL B | 2 | AC (TERMINAL B, TERMINAL B, 2) |

WIRELESS COMMUNICATION SYSTEM, TERMINAL, AND METHOD FOR REPORTING STATUS OF TERMINAL

CROSS REFERENCES TO RELATED APPLICATIONS

The present invention contains subject matter related to Japanese Patent Application JP 2005-233475 filed in the Japanese Patent Office on Aug. 11, 2005, the entire contents of which are incorporated herein by reference.

BACKGROUND OF THE INVENTION

1. Field of the Invention

The present invention relates to wireless communication systems, and more particularly, to a wireless communication system that authenticates the right of access to a wireless network by using an attribute certificate, a terminal used in the wireless communication system, a method for reporting the status of the terminal, and a program for causing a computer to execute the method for reporting the status of the terminal.

2. Description of the Related Art

Due to miniaturization and improvement in performance of electronic apparatuses, it has become easier to carry and use such electronic apparatuses. Thus, an environment that allows a terminal to be connected to a network and to achieve communication at any place necessary has been desired. In such a situation, wireless communication systems utilizing wireless communication are adopted.

In wireless communication systems, in order to prevent access from a terminal that does not have a right of connection with a certain network resource, authorization control utilizing attribute certificates (ACs) is performed. Attribute certificates were newly defined by the X.509 version 3 in March 2000, and the contents of data fields contained in attribute certificates were collectively defined as Standards-Track Request for Comments (RFC) in April 2002. The use of an attribute certificate as an access pass to a network resource enables confirmation of the right of connection with the network resource, and connection permission can be granted only to a terminal holding a connection license.

A wireless communication system in which mutual authentication is performed using an attribute certificate is suggested, for example, in Japanese Unexamined Patent Application Publication No. 2004-274193 (FIG. 1). In this wireless communication system, a terminal identifier of an attribute-certificate-issuing terminal is treated as a network identifier of a network in the wireless communication system, and it is confirmed that network identifiers correspond to each other when authentication is performed.

SUMMARY OF THE INVENTION

In the above-described known technology, a terminal identifier of an attribute-certificate-issuing terminal is treated as a network identifier. Thus, when an attribute-certificate-issuing terminal issues a plurality of attribute certificates, terminals that receive the attribute certificates issued by the attribute-certificate-issuing terminal are connected to the same network.

However, a plurality of networks can be defined in a wireless communication system, and it may be necessary for an attribute-certificate-issuing terminal to issue attribute certificates for different networks. In addition, it is assumed that terminals connected to the same network have a confidential relationship. Thus, if a terminal connected to a first network is permitted to be connected to a second network, to which another terminal connected to the first network is connected, the circle of trust may widen endlessly. For example, when a user wants to temporarily connect a portable apparatus, such as a digital still camera, to a different network, if the portable apparatus is permitted to be connected to the different network on the basis of a right similar to that of connection with a network to which the portable apparatus is normally connected, security concerns occur in both networks.

It is desirable to perform group-aware network identification when the right of access to a network is granted using an attribute certificate in a wireless communication system.

A wireless communication system according to an embodiment of the present invention, a plurality of terminals connected via at least one wireless network. Each of the plurality of terminals identifies a wireless network to which the terminal is to be connected by using a group identifier including a terminal identifier of an issuing terminal that issues an attribute certificate and a first identifier that is set for the issuing terminal. Thus, for connection with a wireless network, a wireless network to which access is authorized can be identified using a group identifier.

A terminal according to another embodiment of the present invention includes operation group identifier holding means for holding, as an operation group identifier of the terminal, a group identifier including a terminal identifier of an issuing terminal that issues an attribute certificate and a first identifier that is set for the issuing terminal; report signal generating means for generating a report signal including the operation group identifier; and report signal transmitting means for transmitting the report signal. Thus, a wireless network to which access is authorized can be identified using an operation group identifier included in a report signal.

In this embodiment, the terminal may further include report signal receiving means for receiving the report signal from a first terminal and registration processing means for issuing a necessary attribute certificate if the first terminal is located within a predetermined range when receiving from the first terminal a registration request for requesting registration to a wireless network in a case where the received report signal indicates that the first terminal is in a registration operation mode and for registering the first terminal to the wireless network. Thus, in response to a registration request, an attribute certificate can be issued.

In this embodiment, the terminal may further include report signal receiving means for receiving the report signal from a first terminal and registration processing means for transmitting to the first terminal a registration request for requesting registration to a wireless network if the first terminal is located within a predetermined range when the received report signal indicates that the first terminal is in a registration operation mode. Thus, when the first terminal entered the registration operation mode before transition of the terminal to the registration operation mode, the terminal transmits a registration request to the first terminal. Here, the registration request may include information indicating whether or not it is necessary to issue an attribute certificate to the terminal.

That is, when the first terminal entered the registration operation mode before the transition of the terminal to the registration operation mode, if the first terminal is located within a predetermined range, the registration processing means transmits to the first terminal a registration request for requesting registration to a wireless network. When the first terminal entered the registration operation mode after the transition of the terminal to the registration operation mode and the terminal received from the first terminal a registration request for requesting registration to a wireless network, if the first terminal is located within a predetermined range, the terminal issues a necessary attribute certificate and registers the first terminal to the wireless network.

In this embodiment, the terminal may further include operation receiving means for receiving an operation instructing disconnection from a wireless network; and resetting means for resetting the operation group identifier held in the operation group identifier holding means when receiving the operation. Thus, a user is able to easily give an operation instructing disconnection from a wireless network. Here, the operation receiving means may include a push button.

In this embodiment, the terminal may further include identifier managing means for managing the first identifier and registration processing means for issuing an attribute certificate in accordance with a new group identifier using the first identifier managed by the identifier managing means if the operation group identifier of the terminal has been reset by the resetting means when the first terminal requests the terminal to issue the attribute certificate. Thus, a user is able to easily give an operation instructing disconnection from a wireless network, and a new group identifier can be generated. Here, the identifier managing means may include a counter that counts the first identifier in order every time a new group identifier is generated.

A method for reporting a status of a terminal according to another embodiment of the present invention or a program according to another embodiment of the present invention for causing a computer to execute processing includes the steps of holding, by a terminal, as an operation group identifier of the terminal, a group identifier including a terminal identifier of an issuing terminal that issues an attribute certificate and a first identifier that is set for the issuing terminal; generating a report signal including the operation group identifier; and transmitting the report signal. Thus, a wireless network to which access is authorized can be identified using an operation group identifier included in a report signal.

Accordingly, an excellent advantage in which group-aware network identification can be realized when the right of access to a network is granted by using an attribute certificate in a wireless communication system can be achieved.

BRIEF DESCRIPTION OF THE DRAWINGS

FIG. 4 shows an example of the configuration of an adjacent terminal list used in the embodiment;

FIG. 5 shows an example of the configuration of an attribute-certificate-issuing terminal list used in the embodiment;

FIG. 7 shows an example of the configuration of an attribute certificate list used in the embodiment;

DESCRIPTION OF THE PREFERRED EMBODIMENTS

Embodiments of the present invention will be described with reference to the drawings.

Figure 1A:
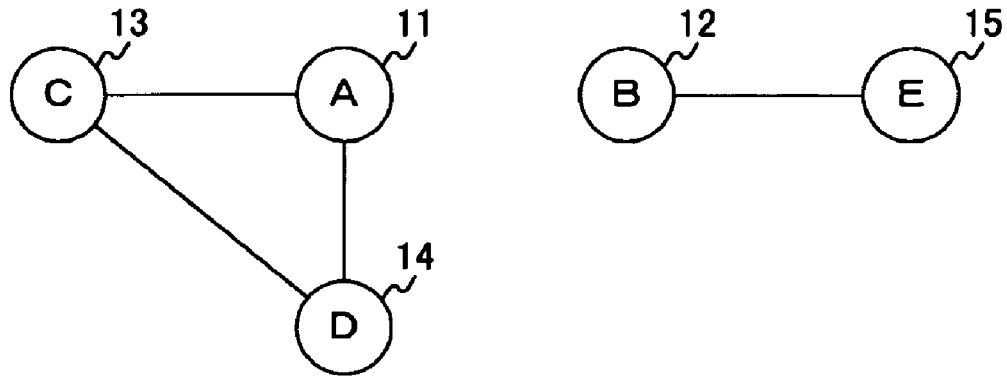
FIGS. 1A, 1B, and 1C show examples of the connection relationship among wireless terminals in a wireless communication system according to an embodiment of the present invention.
Figure 1B:
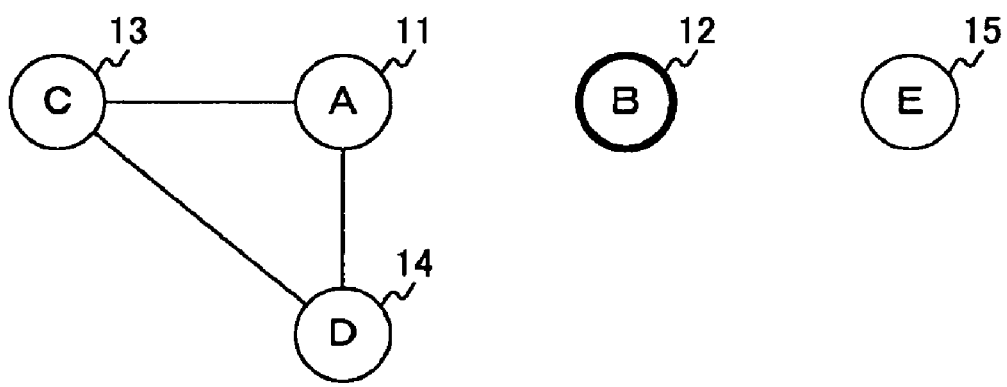
Figure 1C:
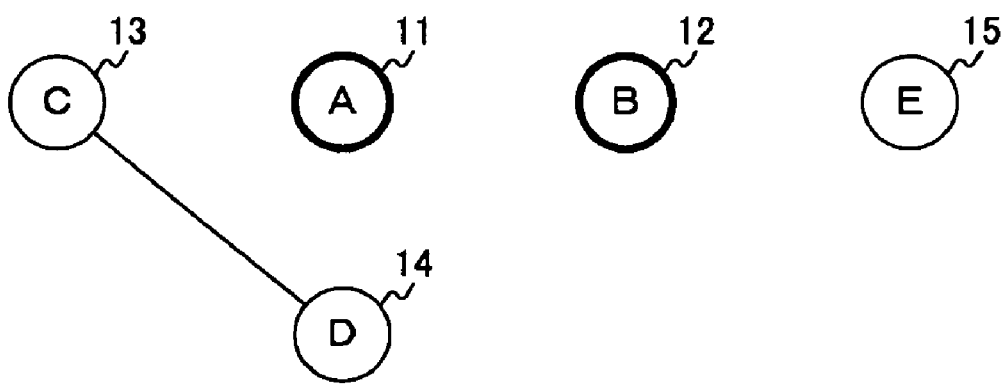

FIGS. 1A to 1C show examples of the connection relationship among wireless terminals in a wireless communication system according to an embodiment of the present invention. Referring to FIG. 1A, wireless terminals A (11), C (13), and D (14) form a network, and wireless terminals B (12) and E (15) form another network. When the wireless terminal A is connected to the wireless terminal B in this state, the wireless terminals A to E belong to the same network.

Referring to FIG. 1B, the wireless terminals A, C, and D form a network, and the wireless terminal B is disconnected from the wireless terminal E, that is, the wireless terminal B is not connected to any network. When the wireless terminal A is connected to the wireless terminal B in this state, the wireless terminal B is connected to the wireless terminal A on a network that is different from the network that was formed by the wireless terminals B and E. Thus, the wireless terminals A to D belong to the same network.

Referring to FIG. 1C, the wireless terminal A is disconnected from the network that was formed by the wireless terminals A, C, and D, that is, the wireless terminal A is not connected to any network. When the wireless terminal A is connected to the wireless terminal B in this state, the wireless terminals A and B form a new network.

In this embodiment, a user selects the type of network to be formed by two connected wireless terminals. That is, in order to cause all the wireless terminals A to E to belong to the same network, registration processing can be performed in the state shown in FIG. 1A. In addition, in order to disconnect the wireless terminal B from the wireless terminal E and to cause the wireless terminals A to D to belong to the same network, registration can be performed in the state shown in FIG. 1B. In addition, in order to cause the wireless terminals A and B to form a new network, registration processing can be performed in the state shown in FIG. 1C.

Each of the wireless terminal B in the state shown in FIG. 1B and the wireless terminals A and B in the state shown in FIG. 1C, represented by thick lines, is in a neutral mode and does not form any network with other wireless terminals. The neutral mode will be described later.

Figure 2:
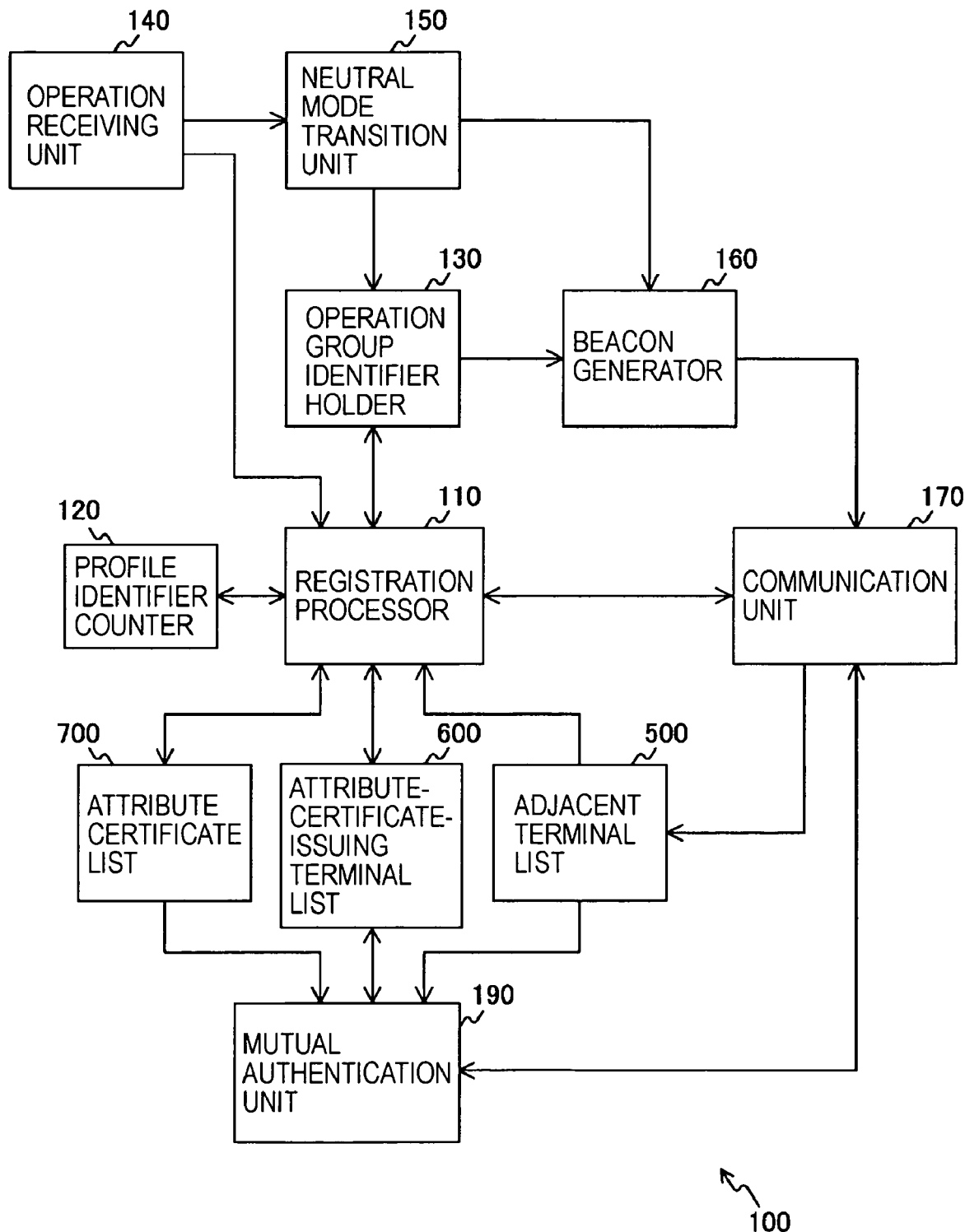
FIG. 2 shows an example of the functional configuration of a wireless terminal in the embodiment.

FIG. 2 shows an example of the functional configuration of a wireless terminal 100 according to this embodiment. Referring to FIG. 2, the wireless terminal 100 includes a registration processor 110, a profile identifier counter 120, an operation group identifier holder 130, an operation receiving unit 140, a neutral mode transition unit 150, a beacon generator 160, a communication unit 170, a mutual authentication unit 190, an adjacent terminal list 500, an attribute-certificate-issuing terminal list 600, and an attribute certificate list 700.

The registration processor 110 performs a registration process for registration to a wireless network with other wireless terminals. In this embodiment, a wireless terminal has two modes, a normal mode in which a normal operation is performed and a registration operation mode in which a registration process for registration to a wireless network is performed. One of two wireless terminals that first enters the registration operation mode serves as an issuing terminal (Authority), which issues an attribute certificate, and the other one of the two wireless terminals that next enters the registration operation mode serves as a requesting terminal (Requestor), which transmits a registration request. In this case, the registration processor 110 performs processing for transmitting a registration request and processing for issuing an attribute certificate and transmitting a registration acknowledgment.

The profile identifier counter 120 manages a profile identifier when the wireless terminal 100 operates as an issuing terminal. The profile identifier counter 120 may be, for example, a 32-bit counter. In known wireless communication systems, a terminal identifier of an issuing terminal that issues an attribute certificate is used as a network identifier, and mutual authentication is performed after correspondence between network identifiers is achieved. In this embodiment, however, since a profile identifier is further provided, a network (or a network group) can be identified in accordance with a group identifier combined from the network identifier and the profile identifier. The profile identifier counter 120 updates a profile identifier every time an attribute certificate is issued using a new group identifier. A terminal identifier may be, for example, a media access control (MAS) address as long as a wireless terminal can be identified using the terminal identifier.

Figure 3:
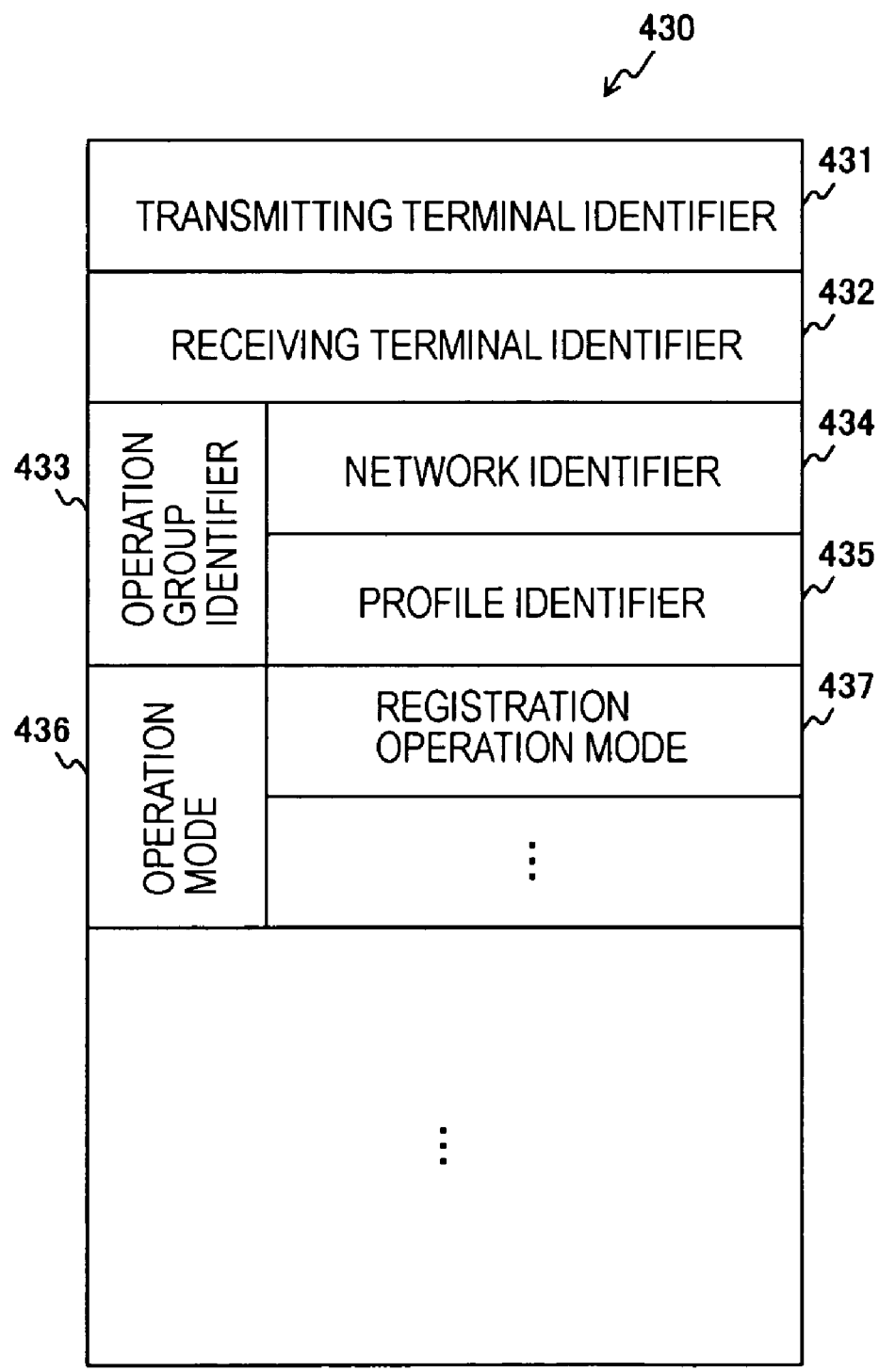
FIG. 3 shows an example of the frame configuration of a beacon used in the embodiment.

The operation group identifier holder 130 holds a group identifier indicated in a beacon as a group identifier of a network group in which the wireless terminal 100 is operating. The beacon generator 160 generates a beacon based on a group identifier held in the operation group identifier holder 130. As shown in FIG. 3, a beacon 430 includes an operation group identifier 433, which is a group identifier of a network group in which the wireless terminal 100 is operating. The operation group identifier 433 includes a network identifier 434 and a profile identifier 435. Since a beacon includes the operation group identifier 433, a group identifier of a network group in which a wireless terminal is operating can be reported to other wireless terminals.

The operation receiving unit 140 receives a user operation. The operation receiving unit 140 may include a registration button for causing the wireless terminal 100 to enter the registration operation mode and a neutral button for causing the wireless terminal 100 to enter the neutral mode. In addition, an operation button may serve as a registration button when being pressed once, and the operation button may serve as a neutral button when being kept pressed.

The neutral mode transition unit 150 causes the wireless terminal 100 to enter the registration operation mode in response to an instruction from the operation receiving unit 140. More specifically, a network identifier held in the operation group identifier holder 130 is set to a terminal identifier of the wireless terminal 100, and a profile identifier held in the operation group identifier holder 130 is set to "0".

The mutual authentication unit 190 performs processing for mutual authentication with another wireless terminal using an attribute certificate. In the processing for mutual authentication, each of terminals authenticates whether or not an attribute certificate received from another terminal is trustworthy. An issuing terminal that issues an attribute certificate signs the attribute certificate. Determination of whether or not the attribute certificate has been altered can be realized by acquiring a message digest by decoding the sign in accordance with a public key of the issuing terminal.

The communication unit 170 performs wireless communication with other wireless terminals. For example, the communication unit 170 transmits beacons generated by the beacon generator 160 to other wireless terminals, and receives beacons from other wireless terminals. In addition, the communication unit 170 performs communication necessary for registration processing performed by the registration processor 110 with other wireless terminals. In addition, the communication unit 170 performs communication necessary for mutual authentication processing performed by the mutual authentication unit 190 with other wireless terminals.

The adjacent terminal list 500 is a list including wireless terminals located adjacent to the wireless terminal 100. The attribute-certificate-issuing terminal list 600 is a list including information on issuing terminals that have issued attribute certificates to the wireless terminal 100. The attribute certificate list 700 is a list including attribute certificates owned by the wireless terminal 100. The adjacent terminal list 500, the attribute-certificate-issuing terminal list 600, and the attribute certificate list 700 will be described in more detail later.

FIG. 3 shows an example of the frame structure of a beacon 430 used in this embodiment. The beacon 430 is regularly transmitted by the communication unit 170. The beacon 430 includes a transmitting terminal identifier 431, a receiving terminal identifier 432, an operation group identifier 433, and an operation mode 436.

The transmitting terminal identifier 431 indicates a terminal identifier of a transmitting terminal. The receiving terminal identifier 432 indicates a terminal identifier of a receiving terminal. In the beacon 430, a broadcast address is used as the receiving terminal identifier 432.

The operation group identifier 433 indicates a group identifier held in the operation group identifier holder 130 of a transmitting terminal. The operation group identifier 433 includes a network identifier 434 and a profile identifier 435. A network is identified as a network group.

The operation mode 436 indicates the operation status of a transmitting terminal. For example, the operation mode 436 includes a registration operation mode 437. A wireless terminal that receives the beacon 430 is capable of recognizing whether the transmitting terminal is in the "registration operation mode" or in the "non-registration operation mode" by referring to the registration operation mode 437.

FIG. 4 shows an example of the configuration of the adjacent terminal list 500 used in this embodiment. The adjacent terminal list 500 holds information on adjacent terminals in corresponding entries in accordance with beacons received from other wireless terminals. The adjacent terminal list 500 includes an index 501, a terminal identifier 502, an operation group identifier 503, and a registration operation mode 506.

The index 501 indicates a serial number added to each entry. The terminal identifier 502 indicates a terminal identifier of an adjacent terminal. The operation group identifier 503 indicates a group identifier of an adjacent terminal. The registration operation mode 506 indicates whether or not an adjacent terminal is in the registration operation mode. The adjacent terminal list 500 is updated every time the communication unit 170 receives a beacon from a wireless terminal, and is referred to when the registration processor 110 performs a registration process.

FIG. 5 shows an example of the configuration of the attribute-certificate-issuing terminal list 600 used in this embodiment. The attribute-certificate-issuing terminal list 600 holds information on issuing terminals that issue attribute certificates in corresponding entries. The attribute-certificate-issuing terminal list 600 includes an index 601, an issuing terminal group identifier 602, an issuing terminal public key certificate 605, and an authentication group identifier 606.

The index 601 indicates a serial number added to each entry. The issuing terminal group identifier 602 indicates a group identifier of an issuing terminal. An issuing terminal indicated by the issuing terminal group identifier 602 is treated as a "Trustworthy".

The issuing terminal public key certificate 605 holds a public key certificate (PKC) of an issuing terminal. The authentication group identifier 606 holds a group identifier of the wireless terminal 100 when an issuing terminal is added to the attribute-certificate-issuing terminal list 600 of the wireless terminal 100. A wireless terminal indicated by the authentication group identifier 606 is a wireless terminal that is trusted when an issuing terminal is added.

The attribute-certificate-issuing terminal list 600 is used for acquiring a group identifier and a public key of an issuing terminal when mutual authentication is performed by the mutual authentication unit 190. In addition, since the authentication group identifier 606 is provided, an appropriate attribute certificate can be retrieved even if an issuing terminal issues a plurality of attribute certificates.

Figure 6:
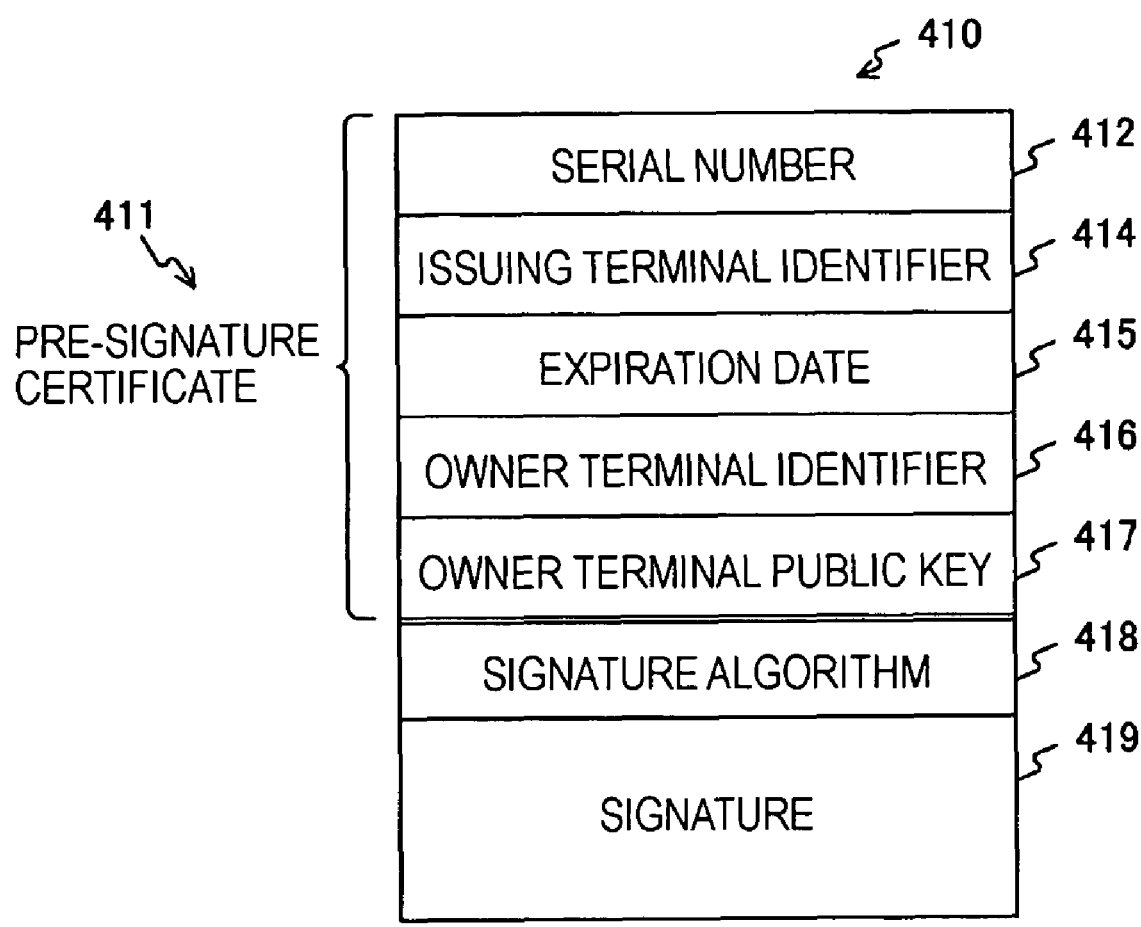
FIG. 6 shows an example of the configuration of a public key certificate held in the attribute-certificate issuing terminal list used in the embodiment.

FIG. 6 shows an example of the configuration of a public key certificate 410 held in the attribute-certificate-issuing terminal list 600 used in this embodiment. The public key certificate 410 mainly includes a pre-signature certificate 411, a signature algorithm 418, and a signature 419. The pre-signature certificate 411 includes a serial number 412, an issuing terminal identifier 414, an expiration date 415, an owner terminal identifier 416, and an owner terminal public key 417.

The serial number 412 indicates a serial number of the public key certificate 410. The serial number 412 is determined in accordance with an issuing terminal of the public key certificate 410. The issuing terminal identifier 414 is a terminal identifier of the issuing terminal of the public key certificate 410. The public key certificate 410 is uniquely identified in accordance with the issuing terminal identifier 414 and the serial number 412. The expiration date 415 indicates an expiration date of the public key certificate 410. The owner terminal identifier 416 is a terminal identifier of a terminal that owns the public key certificate 410. The owner terminal is a wireless terminal that receives an issued public key certificate, and a public key of the owner terminal is held as the owner terminal public key 417.

The signature 419 indicates a signature by the issuing terminal of the public key certificate 410. The signature algorithm 418 indicates a signature algorithm used for the signature 419. The signature algorithm 418 includes a message-digest algorithm and a public-key encryption algorithm. The message-digest algorithm is one of hash functions (digest functions) and is used for creating a message digest of the pre-signature certificate 411. A message digest is acquired by compressing input data (the pre-signature certificate 411) into a bit string of a fixed length and is called a thumb mark, a fingerprint, or the like. As the message digest algorithm, a secure hash algorithm 1 (SHA-1), a message digest #2 (MD2), a message digest #5 (MD5), and the like are known. The public key encryption algorithm is used for encrypting a message digest acquired by the message-digest algorithm in accordance with a private key of an issuing terminal of a public key certificate. As the public key encryption algorithm, a Rivest-Shamir-Adelman (RSA) algorithm based on a unique factorization problem, a digital signature algorithm (DSA) based on a discreet logarithm problem, and the like are known. As described above, the signature 419 is acquired by encrypting a message digest of the pre-signature certificate 411 using a private key of the issuing terminal that issues the public key certificate 410.

Thus, a message digest is acquired by decoding the signature 419 of the public key certificate 410 in accordance with a public key of the issuing terminal that issued the public key certificate 410. A user of the public key certificate 410 creates a message digest of the pre-signature certificate 411 and compares the message digest of the pre-signature certificate 411 with a message digest decoded in accordance with the public key of the issuing terminal that issued the public key certificate 410. Thus, the user of the public key certificate 410 is able to verify that the contents of the pre-signature certificate 411 have not been altered.

FIG. 7 shows an example of the configuration of the attribute certificate list 700 used in this embodiment. The attribute certificate list 700 holds attribute certificates issued to the wireless terminal 100 in corresponding entries. The attribute certificate list 700 includes an index 701, an issuing terminal group identifier 702, and an attribute certificate 705.

The index 701 is a serial number added to each entry. The issuing terminal group identifier 702 indicates a group identifier of an issuing terminal that issues an attribute certificate. The attribute certificate 705 indicates an attribute certificate issued by an issuing terminal to the wireless terminal 100. The attribute certificate 705 included in the attribute certificate list 700 indicates the right granted to the wireless terminal 100 to access to a network group.

Although a plurality of attribute-certificate-issuing terminals exists within a network group in the wireless communication system according to this embodiment, a wireless terminal that receives an attribute certificate issued by any one of the plurality of attribute-certificate-issuing terminals is capable of joining the network group. If a wireless terminal joins a plurality of different network groups and receives attribute certificates issued by attribute-certificate-issuing terminals in the respective groups, a plurality of entries exists in the attribute certificate list 700.

Figure 8:
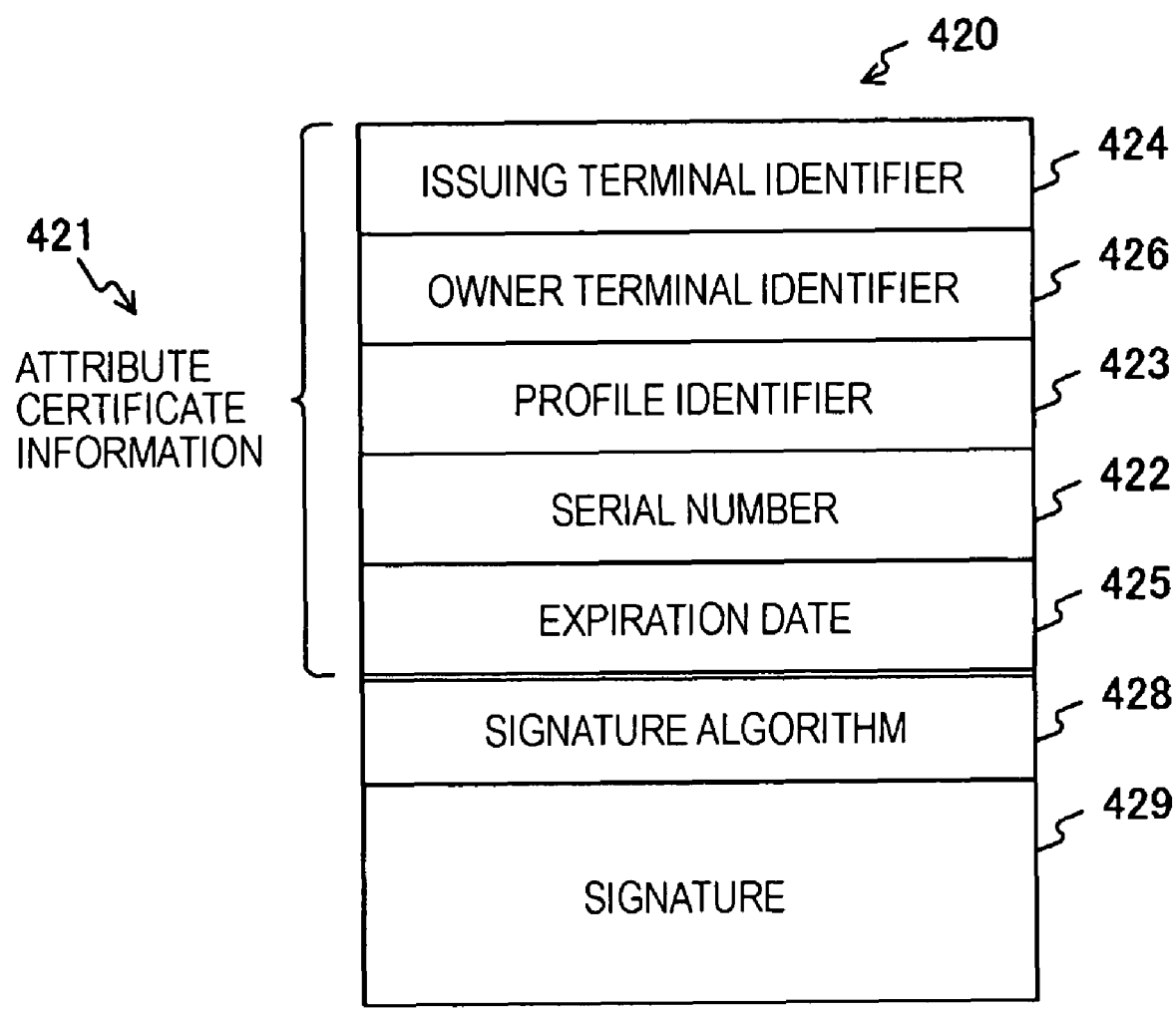
FIG. 8 shows an example of the configuration of an attribute certificate held in the attribute certificate list used in the embodiment.

FIG. 8 shows an example of the configuration of an attribute certificate 420 held in the attribute certificate list 700 used in this embodiment. The attribute certificate 420 mainly includes attribute certificate information 421, a signature algorithm 428, and a signature 429. The attribute certificate information 421 includes an issuing terminal identifier 424, an owner terminal identifier 426, a profile identifier 423, a serial number 422, and an expiration date 425.

The issuing terminal identifier 424 indicates a terminal identifier of an issuing terminal that issues the attribute certificate 420. The owner terminal identifier 426 indicates a terminal identifier of an owner terminal that owns the attribute certificate 420. The profile identifier 423 indicates a profile identifier of the issuing terminal that issues the attribute certificate 420. The serial number 422 indicates a serial number of the attribute certificate 420. The serial number 422 is determined in accordance with the issuing terminal of the attribute certificate 420. The attribute certificate 420 is uniquely identified in accordance with the serial number 422 and the issuing terminal identifier 424. The expiration date 425 indicates an expiration date of the attribute certificate 420.

The signature 429 indicates a signature of the issuing terminal of the attribute certificate 420. The signature algorithm 428 indicates a signature algorithm used for the signature 429. The contents of the signature algorithm 428 are similar to those of the signature algorithm 418 of the public key certificate 410, and the signature 429 is acquired by encrypting a message digest of the attribute certificate information 421 in accordance with a private key of the issuing terminal of the attribute certificate 420.

Thus, a message digest is acquired by decoding the signature 429 of the attribute certificate 420 in accordance with a public key of the issuing terminal of the attribute certificate 420. A user of the attribute certificate 420 creates a message digest of the attribute certificate information 421 and compares the message digest with a message digest acquired by decoding the signature 429 of the attribute certificate 420 in accordance with the public key of the issuing terminal of the attribute certificate 420. Thus, the user is able to verify that the contents of the attribute certificate information 421 have not been altered.

Figure 9:
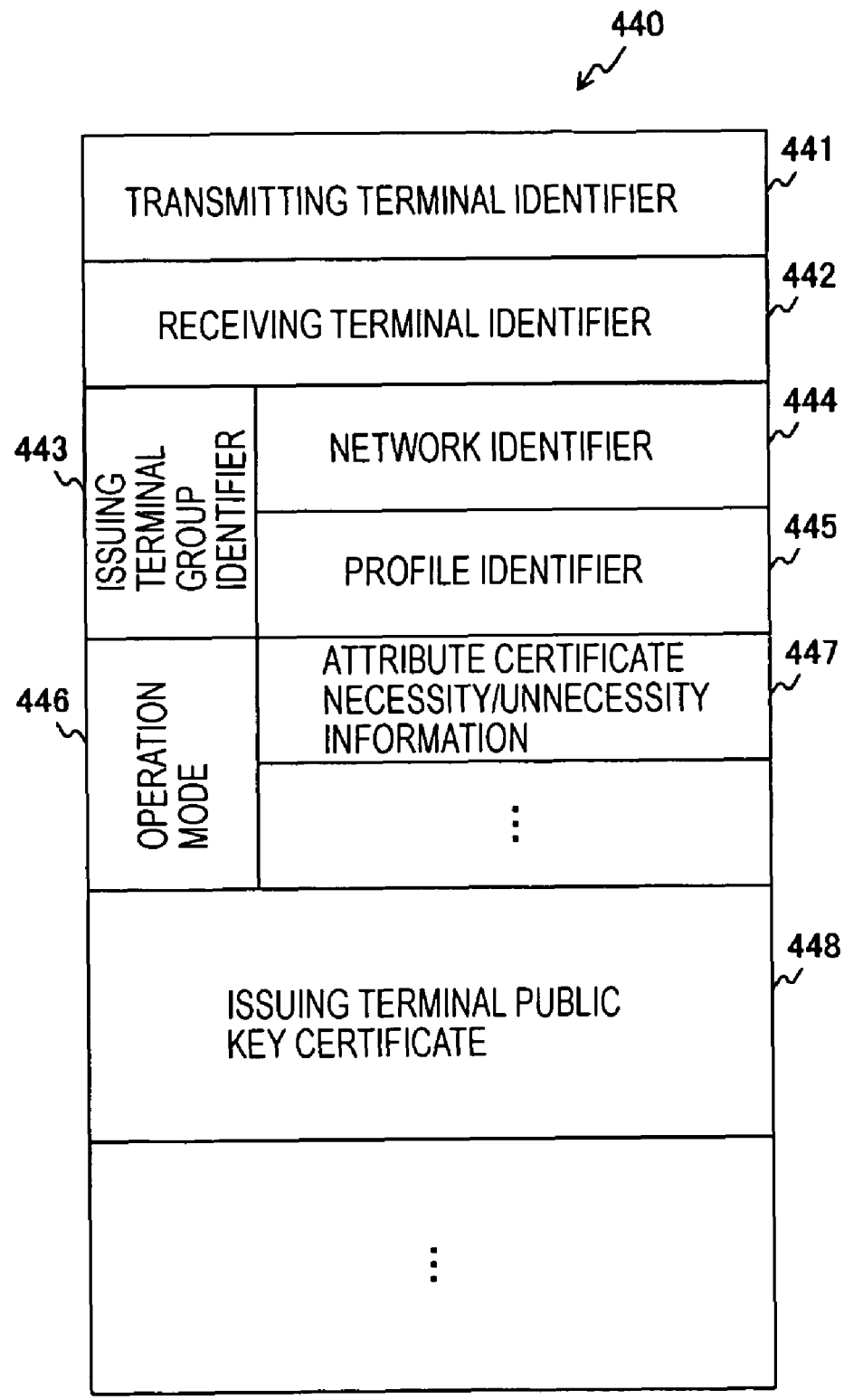
FIG. 9 shows an example of the configuration of a registration request used for a registration process in the embodiment.

FIG. 9 shows an example of the configuration of a registration request 440 used for a registration process in this embodiment. The registration request 440 is transmitted from a requesting terminal to an issuing terminal. The registration request 440 includes a transmitting terminal identifier 441, a receiving terminal identifier 442, an issuing terminal group identifier 443, an operation mode 446, and an issuing terminal public key certificate 448.

The transmitting terminal identifier 441 indicates a terminal identifier of a transmitting terminal (that is, a requesting terminal) that transmits the registration request 440. The receiving terminal identifier 442 indicates a terminal identifier of a receiving terminal (that is, an issuing terminal) that receives the registration request 440. The issuing terminal group identifier 443 indicates a group identifier of an issuing terminal that has already been trusted by the wireless terminal 100. The issuing terminal group identifier 443 includes a network identifier 444 and a profile identifier 445. The issuing terminal group identifier 443 is an optional item. If a corresponding issuing terminal does not exist, the issuing terminal group identifier 443 may be invalid.

The operation mode 446 indicates the operation status of the wireless terminal 100. For example, the operation mode 446 includes attribute certificate issue necessity/unnecessity information 447. An issuing terminal receives the registration request 440, and refers to the attribute certificate issue necessity/unnecessity information 447. Thus, the issuing terminal is capable of recognizing whether or not to issue an attribute certificate.

The issuing terminal public key certificate 448 holds a public key certificate of an issuing terminal represented by the issuing terminal group identifier 443. The issuing terminal public key certificate 448 is also an optional item. If a corresponding issuing terminal does not exist, the issuing terminal public key certificate 448 may not include a public key certificate.

Figure 10:
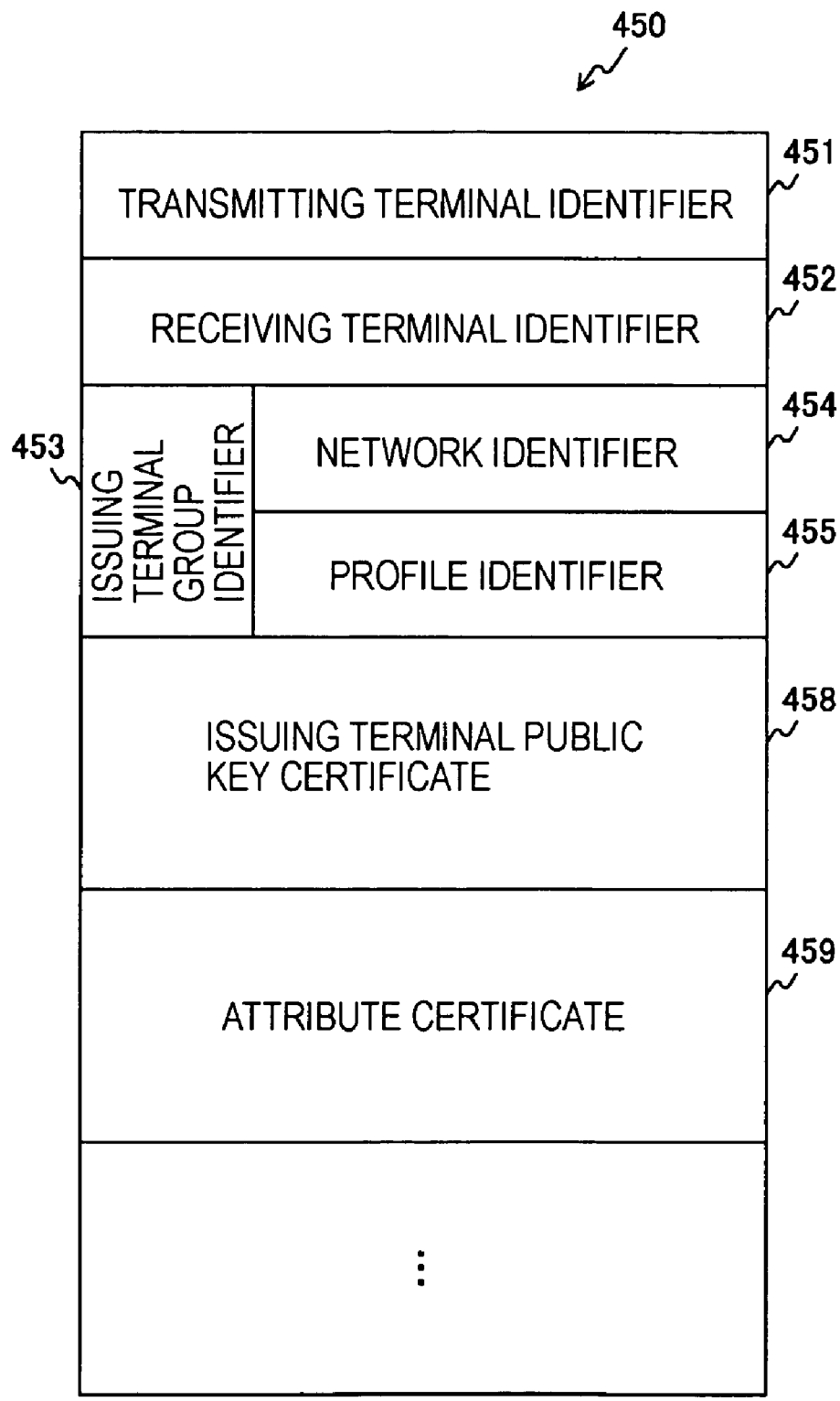
FIG. 10 shows an example of the configuration of a registration acknowledgment used for the registration process in the embodiment.

FIG. 10 shows an example of the configuration of a registration acknowledgment 450 used for a registration process in this embodiment. The registration acknowledgment 450 is transmitted from an issuing terminal to a requesting terminal. The registration acknowledgment 450 includes a transmitting terminal identifier 451, a receiving terminal identifier 452, an issuing terminal group identifier 453, an issuing terminal public key certificate 458, and an attribute certificate 459.

The transmitting terminal identifier 451 indicates a terminal identifier of a transmitting terminal (that is, an issuing terminal) that transmits the registration acknowledgment 450. The receiving terminal identifier 452 indicates a terminal identifier of a receiving terminal (that is, a requesting terminal) that receives the registration acknowledgment 450. The issuing terminal group identifier 453 indicates a group identifier of an issuing terminal that is newly registered in the attribute-certificate-issuing terminal list 600. The issuing terminal group identifier 453 includes a network identifier 454 and a profile identifier 455.

The issuing terminal public key certificate 458 holds a public key certificate of an issuing terminal represented by the issuing terminal group identifier 453. The attribute certificate 459 holds an attribute certificate that is currently being issued.

The items contained within the registration request 440 (see FIG. 9) and the items contained within the registration acknowledgment 450 (see FIG. 10) are different depending on the connection states (see FIGS. 1A to 1C) between wireless terminals.

When each of the wireless terminal A and the wireless terminal B forms an independent network, as shown in FIG. 1A, if a registration process is performed, the wireless terminal A and the wireless terminal B belong to the same network group. Since both the wireless terminals A and B have attribute certificates for joining a network group, only entries of the attribute-certificate-issuing terminal lists 600 are exchanged between the wireless terminals A and B without issuing an attribute certificate so as not to increase attribute certificates. A requesting terminal selects from the attribute-certificate-issuing terminal list 600 of the requesting terminal an entry including an authentication group identifier 606 that is equal to a group identifier currently being used (held in the operation group identifier holder 130), and adds to the registration request 440 the issuing terminal group identifier 602 and the issuing terminal public key certificate 605 of the selected entry. The issuing terminal receives the registration request 440. If the requesting terminal is located within a defined range, the issuing terminal adds the entry of the attribute-certificate-issuing terminal list 600 included in the registration request 440 to the attribute-certificate-issuing terminal list 600 of the issuing terminal. Then, the issuing terminal selects from the attribute-certificate-issuing terminal list 600 of the issuing terminal an entry including an authentication group identifier 606 that is equal to a group identifier currently being used (held in the operation group identifier holder 130), and adds to the registration acknowledgment 450 the issuing terminal group identifier 602 and the issuing terminal public key certificate 605 of the selected entry. Then, the issuing terminal transmits to the requesting terminal the registration acknowledgment 450 including the issuing terminal group identifier 602 and the issuing terminal public key certificate 605 of the selected entry. The requesting terminal receives the registration acknowledgment 450. The requesting terminal adds the entry of the attribute-certificate-issuing terminal list 600 of the issuing terminal included in the registration acknowledgment 450 to the entry of the attribute-certificate-issuing terminal list 600 of the requesting terminal.

When the wireless terminal B serving as an issuing terminal is operating in the neutral mode, as shown in FIG. 1B, the wireless terminal A serving as a requesting terminal owns an attribute certificate. Thus, the requesting terminal selects from the attribute-certificate-issuing terminal list 600 of the requesting terminal an entry including an authentication group identifier 606 that is equal to a group identifier currently being used (held in the operation group identifier holder 130), and adds to the registration request 440 the issuing terminal group identifier 602 and the issuing terminal public key certificate 605 of the selected entry. Then, the requesting terminal transmits to the issuing terminal the registration request 440 including the issuing terminal group identifier 602 and the issuing terminal public key certificate 605 of the selected entry. The issuing terminal receives the registration request 440, and issues only to the issuing terminal an attribute certificate used for this network group, in order to avoid redundancy. Then, the issuing terminal adds the issuing terminal to the attribute-certificate-issuing terminal list 600. In this case, a new group identifier (a terminal identifier of the issuing terminal and a newly allocated profile identifier) is set as the issuing terminal group identifier 602, and a public key certificate of the issuing terminal is stored as the issuing terminal public key certificate 605. Then, the new group identifier is set as the authentication group identifier 606. The registration acknowledgment 450 includes the issuing terminal group identifier 602 and the issuing terminal public key certificate 605 of the newly added entry of the attribute-certificate-issuing terminal list 600. The requesting terminal receives the registration acknowledgment 450. The requesting terminal stores the authentication group identifier 606 of the entry of the attribute-certificate-issuing terminal list 600 as the group identifier currently being used (held in the operation group identifier holder 130).

When the wireless terminal B serving as a requesting terminal is operating in the neutral mode, as shown in FIG. 1B, the requesting terminal transmits a registration request not including the attribute-certificate-issuing terminal list 600. An issuing terminal receives the registration request. If the requesting terminal is located within a defined range, the issuing terminal issues an attribute certificate and stores the attribute certificate into a registration acknowledgment. In addition, the issuing terminal selects from the attribute-certificate-issuing terminal list 600 of the issuing terminal an entry including an authentication group identifier 606 that is equal to the group identifier currently being used (held in the operation group identifier holder 130), and adds to the registration acknowledgment the issuing terminal group identifier 602 and the issuing terminal public key certificate 605 of the selected entry. Then, the issuing terminal transmits to the requesting terminal the registration acknowledgment including the issuing terminal group identifier 602 and the issuing terminal public key certificate 605 of the selected entry. The requesting terminal receives the registration acknowledgment. The requesting terminal adds the attribute certificate to the attribute-certificate-issuing terminal list 600 of the requesting terminal, and adds to the attribute-certificate-issuing terminal list 600 the issuing terminal public key certificate 605 included in the registration acknowledgment. In this case, a group identifier of the issuing terminal is set as the issuing terminal group identifier 602 and the authentication group identifier 606. In addition, the requesting terminal adds to the entry of the attribute-certificate-issuing terminal list 600 of the requesting terminal the entry of the attribute-certificate-issuing terminal list 600 included in the registration acknowledgment.

In the example shown in FIG. 1C, the wireless terminal A or the wireless terminal B has an attribute certificate for establishing a network group. A requesting terminal transmits a registration request not including an attribute-certificate-issuing terminal list. An issuing terminal transmits a registration acknowledgment including an attribute certificate issued by the issuing terminal and a public key certificate of the issuing terminal. The requesting terminal receives the registration acknowledgment, and adds to the attribute-certificate-issuing terminal list 600 the public key certificate of the issuing terminal included in the registration acknowledgment. In this case, a group identifier of the issuing terminal is set as the issuing terminal group identifier 602 and the authentication group identifier 606.

The operation of the wireless terminal 100 in this embodiment is described next.

Figure 11:
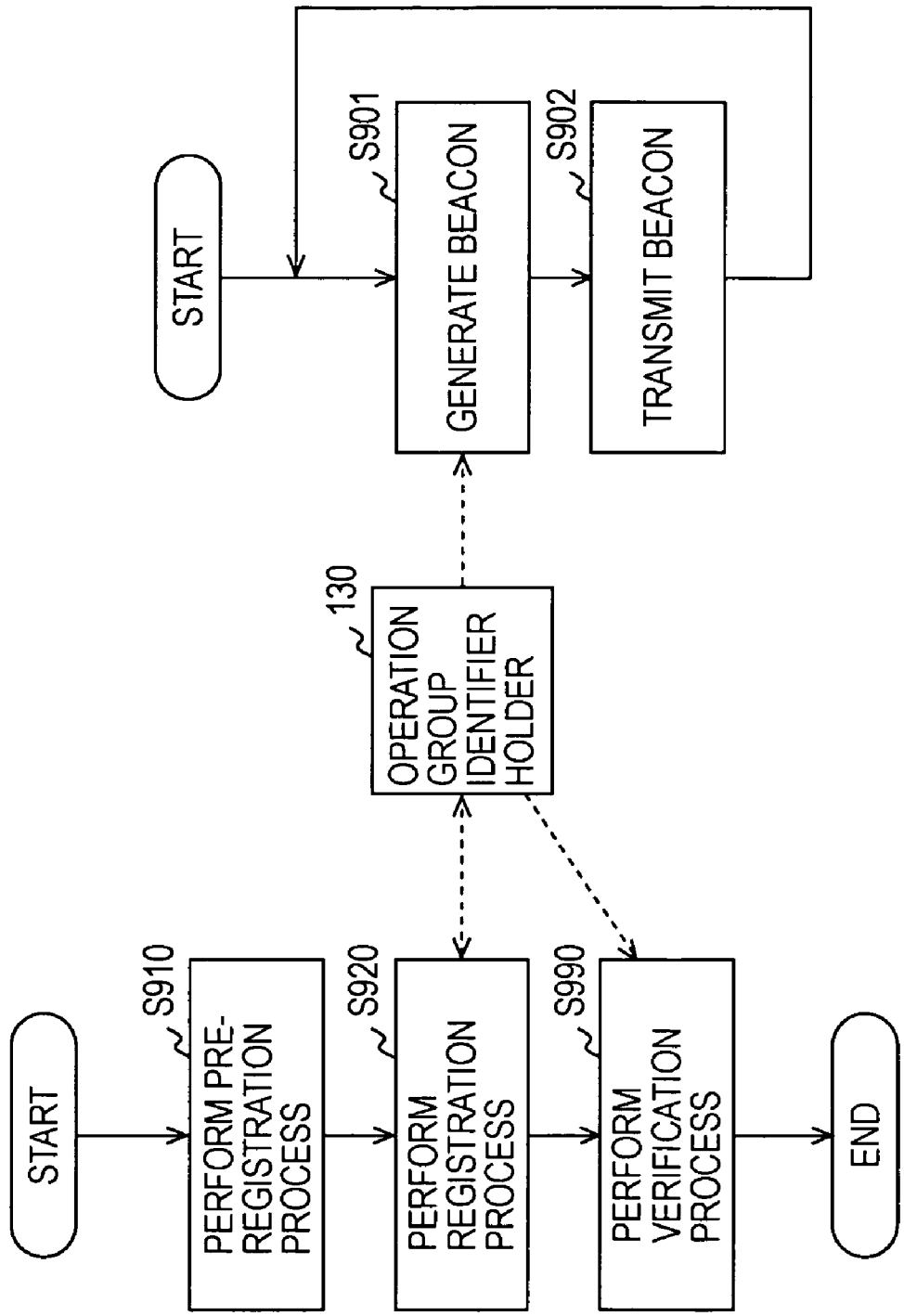
FIG. 11 is a flowchart of the entire process in the embodiment.

FIG. 11 is a flowchart of the entire process in this embodiment. A group identifier held in the operation group identifier holder 130 is referred to when a beacon is generated (step S901), and the beacon including the group identifier as the operation group identifier 433 is regularly transmitted to another wireless terminal (step S902).

A pre-registration process for determining whether or not a wireless terminal has entered the neutral mode is performed in advance (step S910). A beacon transmitted from another wireless terminal includes the registration operation mode 437 as the operation mode 436, and a registration process including issuing of an attribute certificate is performed in accordance with the registration operation mode 437 (step S920). In response to the registration process, a group identifier held in the operation group identifier holder 130 is appropriately updated. Then, when predetermined conditions are met, mutual authentication using an attribute certificate is performed (step S990).

Figure 12:
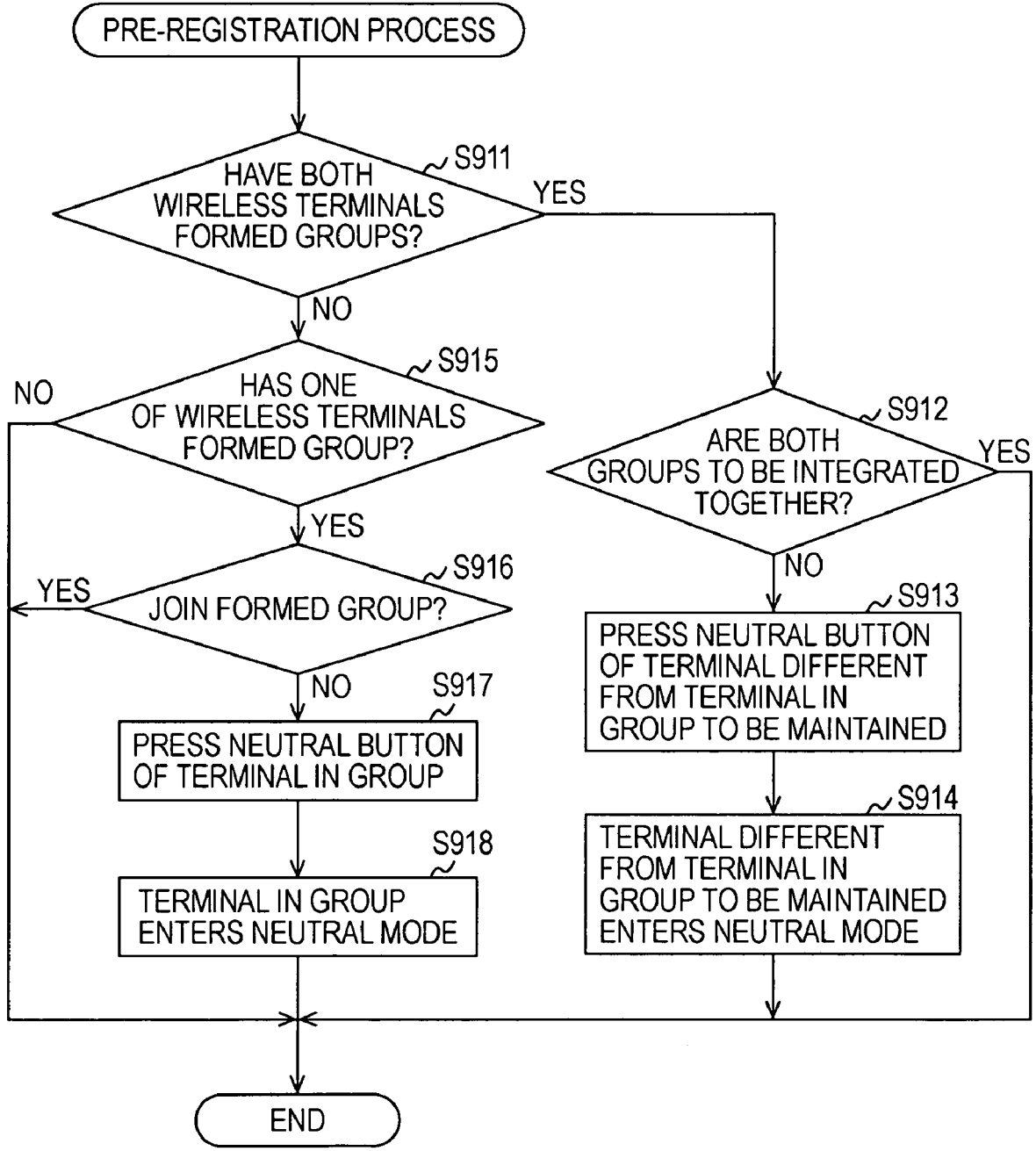
FIG. 12 is a flowchart of a pre-registration process in the embodiment.

FIG. 12 is a flowchart of the pre-registration process performed in this embodiment. It is determined whether or not two wireless terminals to be subjected to registration processing have already formed respective network groups (step S911). If it is determined in step S911 that both the wireless terminals have already formed respective network groups, it is determined whether or not the two network groups should be integrated together by a registration process (step S912).

If a user wants to integrate the network groups together, the user presses a registration button. Thus, the process proceeds to the registration process. If the user does not want to integrate the network groups together, the user presses a neutral button of a terminal that is different from a terminal forming a network group to be maintained (step S913). Thus, the terminal that is different from the terminal forming the network group to be maintained enters the neutral mode (step S914). Then, when the user presses the registration button, the process proceeds to the registration process.

If it is determined in step S911 that both the wireless terminals have not formed respective network groups, it is determined whether or not one of the wireless terminals has formed a network group (step S915). Then, it is determined whether or not a user wants to join a network group formed by one of the wireless terminals (step S916). If it is determined in step S915 that neither of the wireless terminals has formed a network group, or if it is determined in step S916 that the user wants to join a network group formed by one of the wireless terminals, the user presses the registration button. Thus, the process proceeds to the registration process.

If it is determined in step S916 that the user does not want to join a network group formed by one of the two wireless terminals, the user presses the neutral button of the wireless terminal that has formed the network group (step S917). Thus, the wireless terminal that has formed the network group enters the neutral mode (step S918). Since the other one of the wireless terminals that has not formed a network group has already entered the neutral mode, both the wireless terminals are now in the neutral mode. Then, when the user presses the registration button, the process proceeds to the registration process.

Figure 13:
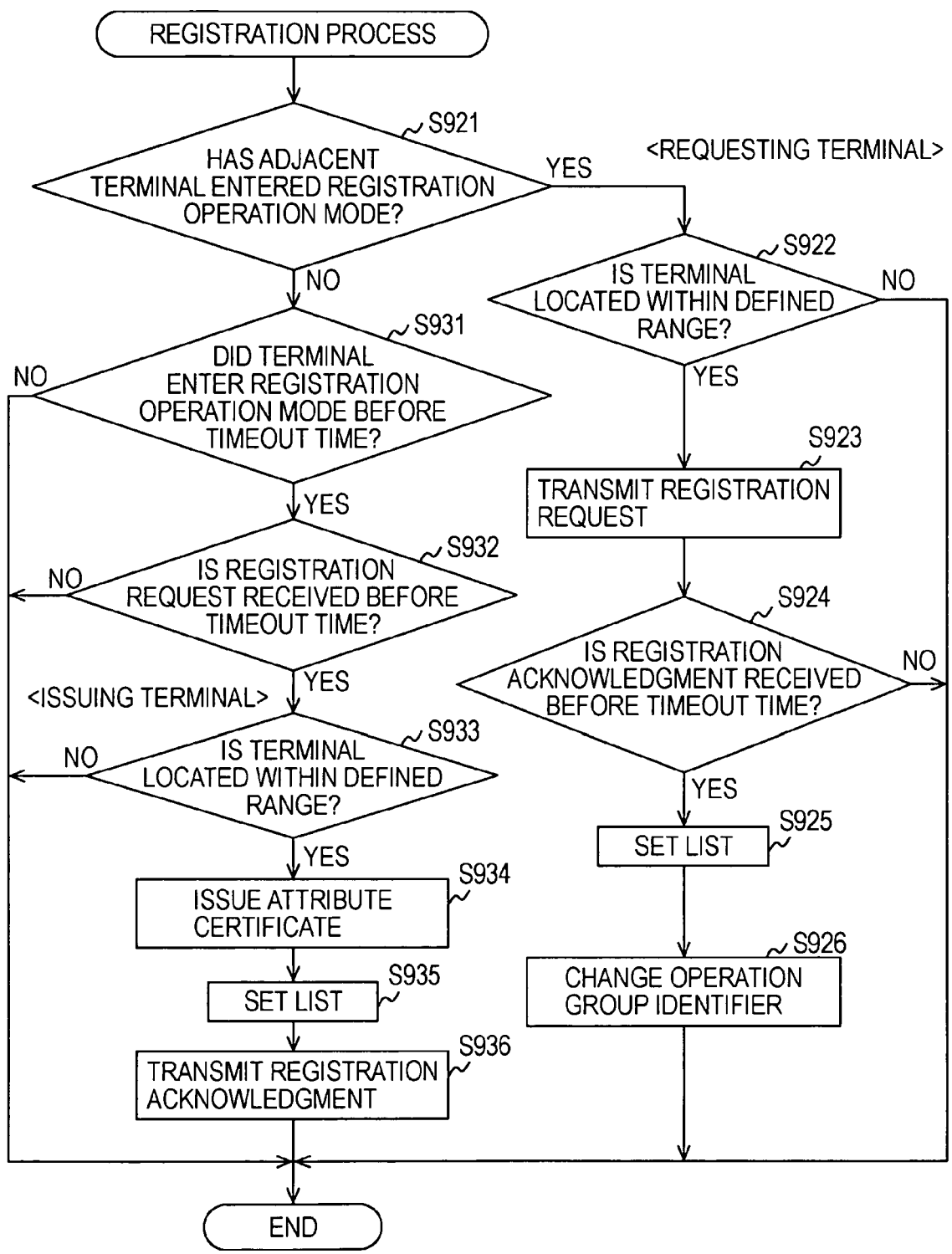
FIG. 13 is a flowchart of a registration process in the embodiment.

FIG. 13 is a flowchart of the registration process in this embodiment. When the wireless terminal 100 enters the registration operation mode, it is determined whether or not a beacon received from an adjacent terminal indicates a registration operation mode (step S921). If it is determined in step S921 that a beacon received from an adjacent terminal indicates the registration operation mode, since the wireless terminal 100 entered the registration operation mode after transition of the adjacent terminal to the registration operation mode, the wireless terminal 100 serves as a requesting terminal. The determination of whether or not an adjacent terminal has entered the registration operation mode is may be performed by referring to the registration operation mode 506 in the adjacent terminal list 500 or by directly referring to the registration operation mode 437 of the beacon 430.

The wireless terminal 100 determines whether or not the wireless terminal that first entered the registration operation mode is located within a defined range (step S922). This determination may be performed by calculating distance in accordance with communication with the wireless terminal and determining whether or not the distance is within the defined range or by identifying a positional relationship using a directional signal and determining whether or not the position is located within the defined range. If the wireless terminal is located within the defined range, the wireless terminal 100 transmits a registration request to the wireless terminal that first entered the registration operation mode (step S923).

It is determined whether or not a registration acknowledgment for the registration request is received within a time-out period (step S924). If it is determined in step S924 that a registration acknowledgment for the registration request is received within the time-out period, information on an attribute certificate and an attribute-certificate-issuing terminal included in the registration acknowledgment are set in the attribute certificate list 700 and the attribute-certificate-issuing terminal list 600 (step S925). In accordance with this, the wireless terminal 100 updates the operation group identifier holder 130 on the basis of the attribute certificate included in the registration acknowledgment. Thus, an operation group identifier included in a beacon is changed (step S926).

If it is determined in step S921 that a beacon received from an adjacent terminal does not indicate the registration operation mode when the wireless terminal 100 enters the registration operation mode, since the wireless terminal 100 entered the registration operation mode before transition of the adjacent terminal to the registration operation mode, the wireless terminal 100 serves as an issuing terminal. However, the wireless terminal 100 serves as an issuing terminal only when a wireless terminal (requesting terminal) enters the registration operation mode before timeout time (step S931) and a registration request is received from the requesting terminal before the timeout time (S932).

Then, the wireless terminal 100 determines whether or not the wireless terminal is located within a defined range (step S933). This determination can be performed as in the determination processing of step S922. If it is determined in step S933 that the wireless terminal is located within the defined range, the wireless terminal 100 performs an attribute-certificate-issuing process (step S934). In accordance with this, information on an issued attribute certificate and an attribute-certificate-issuing terminal are set in the attribute certificate list 700 and the attribute-certificate-issuing terminal list 600 (step S935). If the registration request includes information on an attribute-certificate-issuing terminal, the information on the attribute-certificate-issuing terminal is also set in the attribute-certificate-issuing terminal list 600. Then, the wireless terminal 100 transmits the registration acknowledgment to the requesting terminal (step S936).

Figure 14:
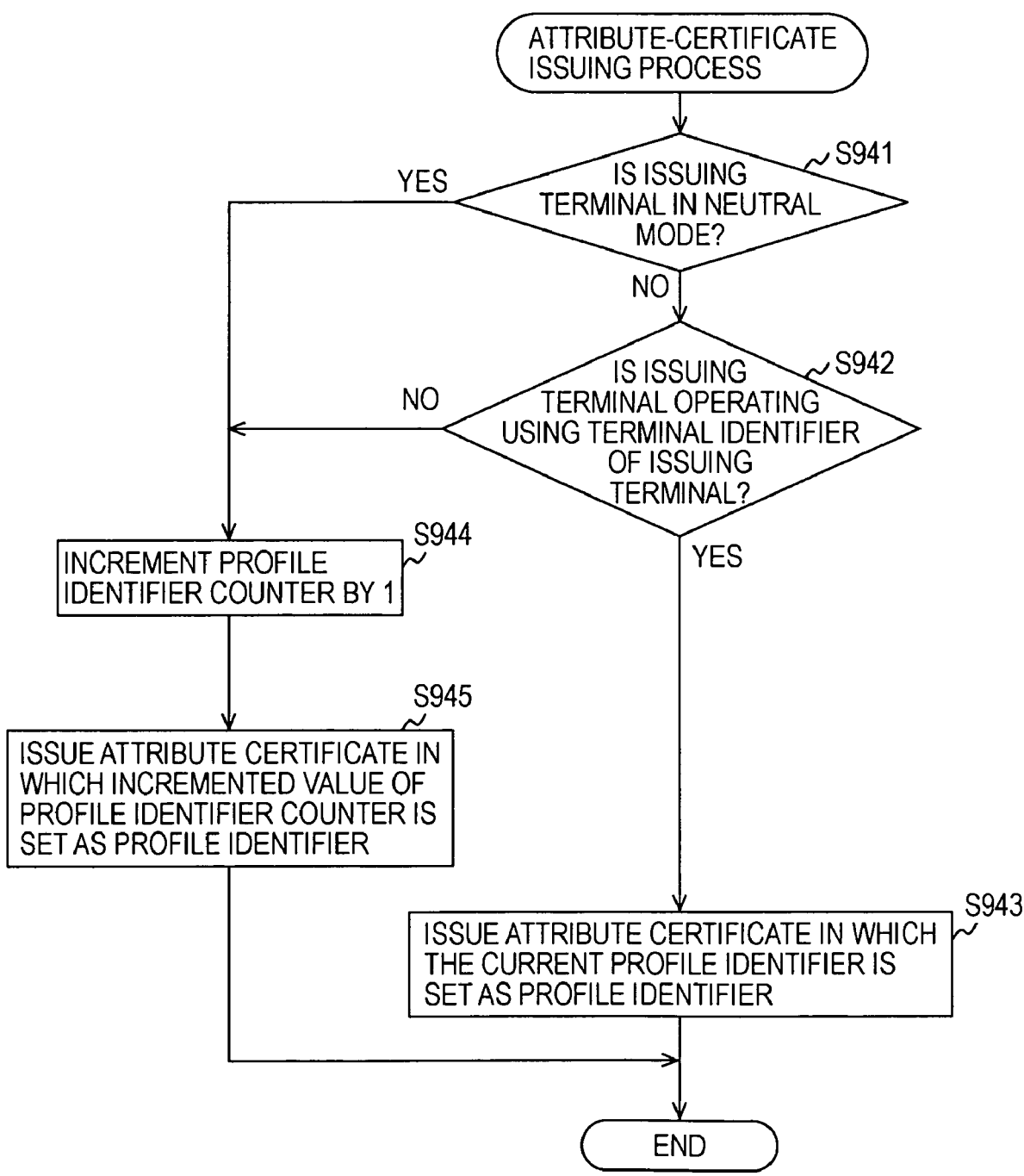
FIG. 14 is a flowchart of an attribute-certificate-issuing process in the embodiment.

FIG. 14 is a flowchart of the attribute-certificate-issuing process according to this embodiment. It is determined whether or not the wireless terminal 100 is in the neutral mode (S941). If it is determined in step S941 that the wireless terminal 100 is not in the neutral mode, it is determined whether or not the network identifier 434 included in the beacon 430 transmitted from the wireless terminal 100 corresponds to the terminal identifier of the wireless terminal 100 (step S942). If it is determined in step S942 that the network identifier 434 included in the beacon 430 transmitted from the wireless terminal 100 corresponds to the terminal identifier of the wireless terminal 100, the attribute certificate 420 in which the profile identifier 435 included in the beacon 430 is set as the profile identifier 423 is issued (step S943).

If it is determined in step S941 that the wireless terminal 100 is in the neutral mode or if it is determined in step S942 that the network identifier 434 included in the beacon 430 transmitted from the wireless terminal 100 that is not in the neutral mode does not correspond to the terminal identifier of the wireless terminal 100, the value of the profile identifier counter 120 is, for example, incremented by 1 (step S944). Then, the attribute certificate 420 in which, for example, the incremented value of the profile identifier counter 120 is set as the profile identifier 423 is issued (step S945).

If the attribute certificate issue necessity/unnecessity information 447 of the registration request 440 indicates that it is unnecessary to issue an attribute certificate, an attribute certificate is not issued to a requesting terminal. However, even in this case, an attribute certificate is issued to the wireless terminal 100 itself.

Figure 15:
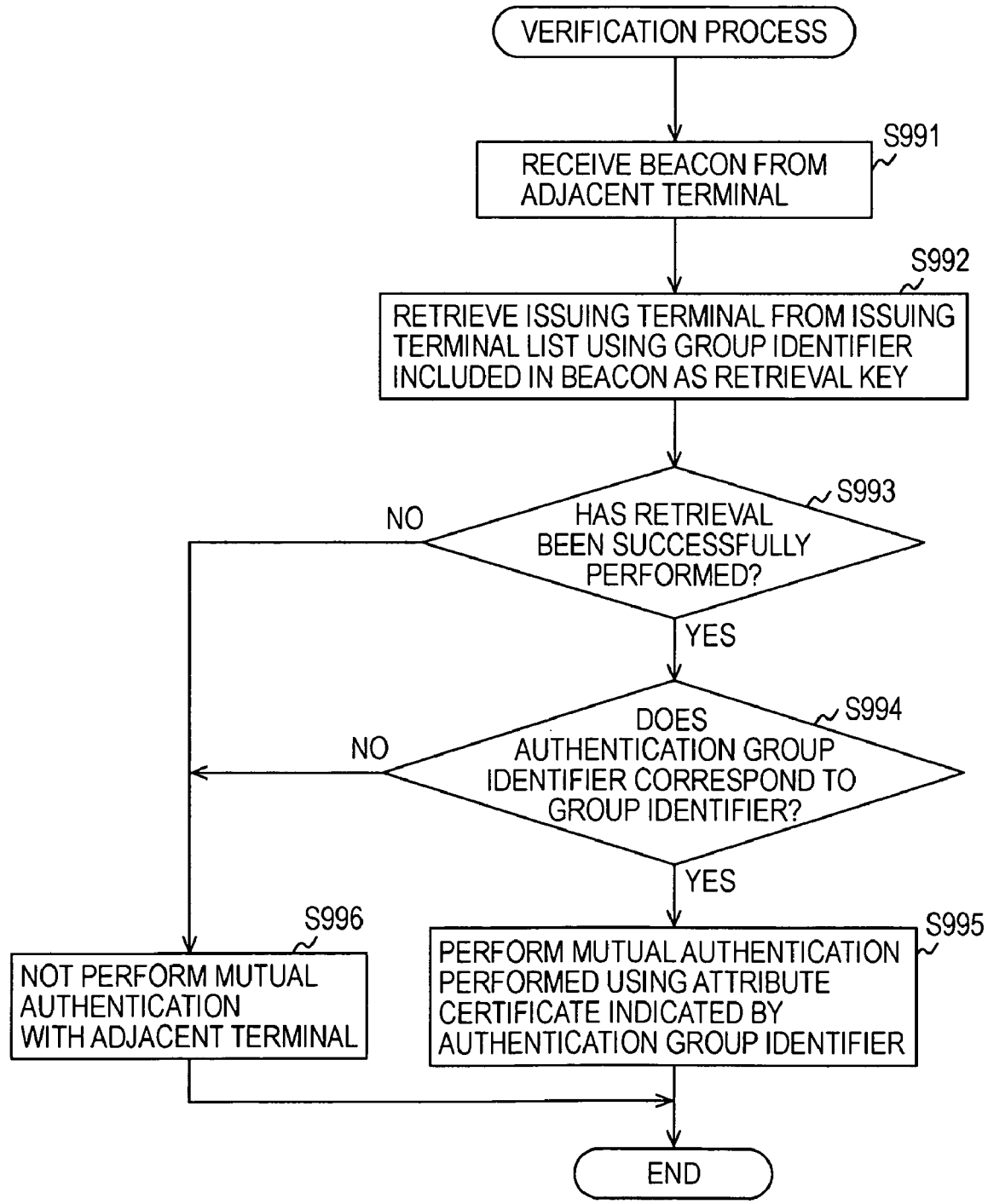
FIG. 15 is a flowchart of a verification process in the embodiment.

FIG. 15 is a flowchart of a verification process in this embodiment. When receiving a beacon from an adjacent terminal (step S991), the wireless terminal 100 retrieves the issuing terminal group identifier 602 of the attribute-certificate-issuing terminal list 600 using the operation group identifier 433 included in the beacon as a retrieval key (step S992).

Then, it is determined whether or not the retrieval has been successfully performed (step S993). If it is determined in step S993 that the retrieval has been successfully performed, it is determined whether or not the authentication group identifier 606 of the retrieved entry corresponds to a group identifier held in the operation group identifier holder 130 (step S994). If it is determined in step S994 that the authentication group identifier 606 of the retrieved entry corresponds to the group identifier held in the operation group identifier holder 130, the mutual authentication unit 190 acquires 606 from the attribute certificate list 700 the attribute certificate 705 corresponding to the authentication group identifier, and performs mutual authentication (step S995).

If it is determined in step S993 that a corresponding entry is not retrieved from the attribute-certificate-issuing terminal list 600 or if it is determined in step S994 that the authentication group identifier 606 of the retrieved entry does not correspond to the group identifier held in the operation group identifier holder 130, the mutual authentication unit 190 does not execute mutual authentication with the adjacent terminal (step S996).

An operation example of the wireless communication system according to this embodiment is described next with reference to FIG. 16.

Figure 16:
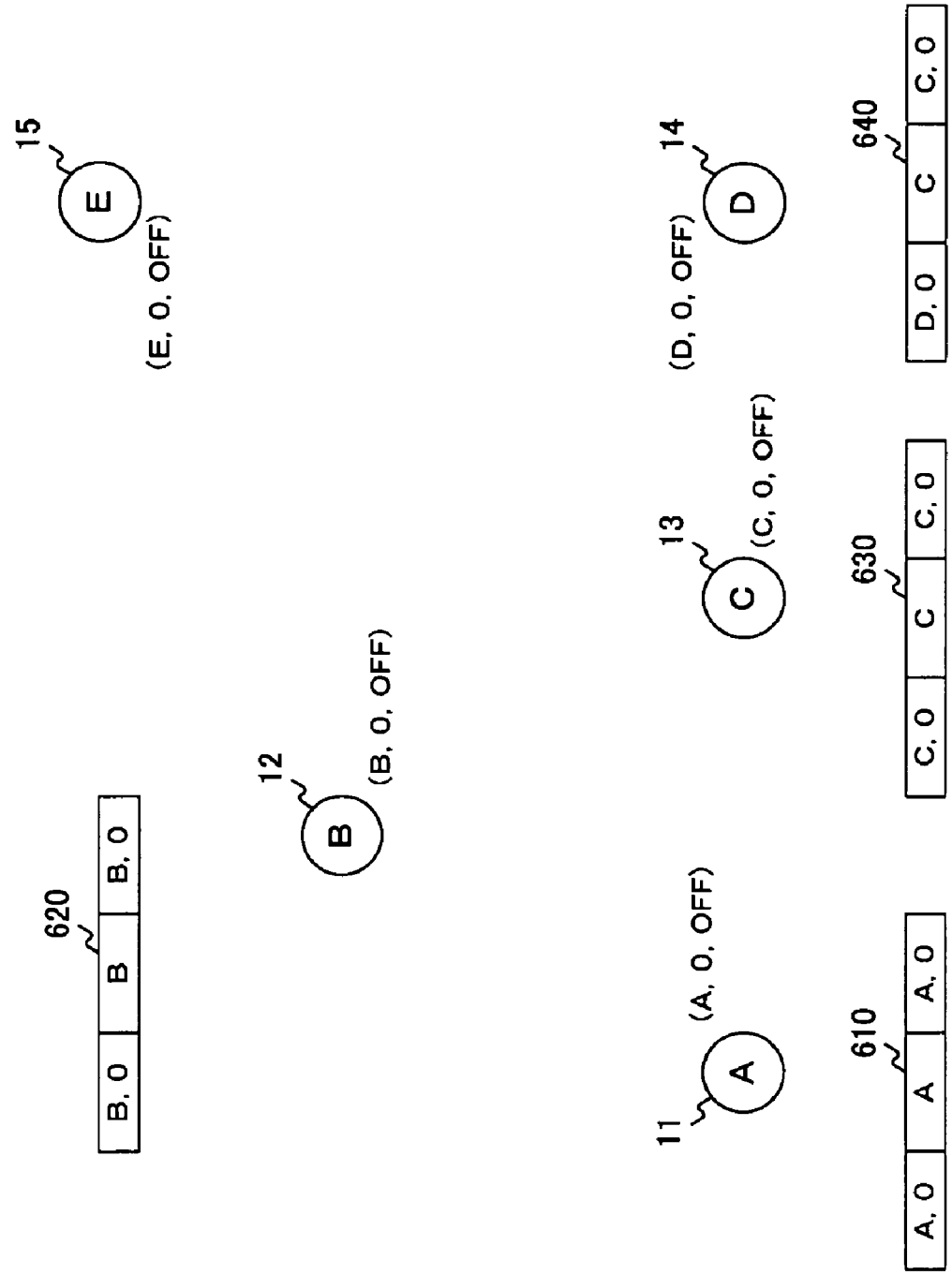
FIG. 16 shows an example of an initial state of wireless terminals in the wireless communication system in the embodiment.

FIG. 16 shows an example of an initial state of the wireless terminals A to E in the wireless communication system according to this embodiment. Each of the wireless terminals A to E does not form a network group in the initial state. Each of attribute-certificate-issuing terminal lists 610 to 640 corresponds to the attribute-certificate-issuing terminal list 600 of each of the wireless terminals A to D.

In the following examples, for example, the left column of the attribute-certificate-issuing terminal list 610 of the wireless terminal A corresponds to the issuing terminal group identifier 602 of the attribute-certificate-issuing terminal list 600, the center column of the attribute-certificate-issuing terminal list 610 corresponds to the owner terminal identifier 416 of the issuing terminal public key certificate 605 of the attribute-certificate-issuing terminal list 600, and the right column of the attribute-certificate-issuing terminal list 610 corresponds to the authentication group identifier 606 of the attribute-certificate-issuing terminal list 600. Each of the wireless terminals A to D does not own an attribute certificate for establishing a network group in the initial state shown in FIG. 16.

Figure 17:
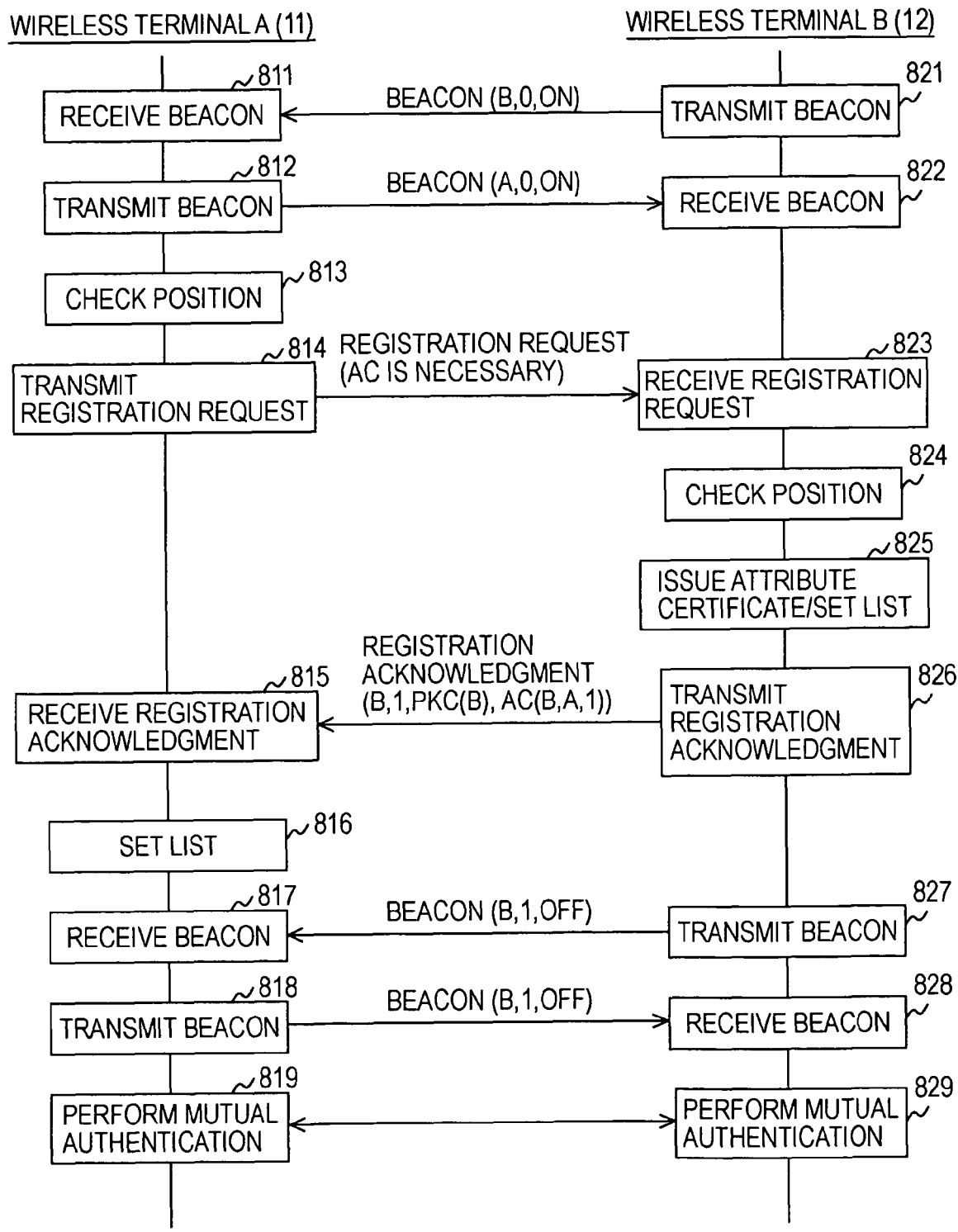
FIG. 17 is a sequence flow diagram showing a process until mutual authentication between wireless terminals in the initial state in the wireless communication system in the embodiment.

FIG. 17 is a sequence flow diagram showing a process until mutual authentication performed by the wireless terminals A and B in the initial state in the wireless communication system according to this embodiment. In the initial state, which is described above with reference to FIG. 16, the wireless terminal B transmits a beacon to the wireless terminal A (step 821), and the wireless terminal A receives the beacon (step 811). Then, the wireless terminal A transmits a beacon to the wireless terminal B (step 812), and the wireless terminal B receives the beacon (step 822). The wireless terminal B sets a terminal identifier of the wireless terminal B as the network identifier 434, sets "0" as the profile identifier 435, and sets the registration operation mode as the registration operation mode 437. The wireless terminal A sets a terminal identifier of the wireless terminal A as the network identifier 434, sets "0" as the profile identifier 435, and sets the registration operation mode as the registration operation mode 437.

Since the wireless terminal A recognizes that the wireless terminal A entered the registration operation mode after transition of the wireless terminal B to the registration operation mode, the wireless terminal A serves as a requesting terminal. Thus, the wireless terminal A checks the position of the wireless terminal B (step 813). When the wireless terminal B is located within a defined range, the wireless terminal A transmits a registration request (step 814). The registration request includes the attribute certificate issue necessity/unnecessity information 447 indicating that it is necessary to issue an attribute certificate.

Even if the wireless terminal E, which is located remote from the wireless terminal A, entered the registration operation mode at the same time, the wireless terminal B is selected by checking the position of the wireless terminal B. Such position checking may be performed in accordance with distance or may be identified using directional infrared rays or the like. The same applied to position checking in the following processing.

The wireless terminal B receives the registration request (step 823), and checks that the wireless terminal A is located within the defined range (step 824). Then, the wireless terminal B issues an attribute certificate to the wireless terminal A (step 825). In this attribute certificate, the terminal identifier of the wireless terminal B is set as the issuing terminal identifier 424, the terminal identifier of the wireless terminal A is set as the owner terminal identifier 426, and a newly generated value "1" is set as the profile identifier 423.

The wireless terminal B also issues an attribute certificate to the wireless terminal B. In this attribute certificate, the terminal identifier of the wireless terminal B is set as the issuing terminal identifier 424 and the owner terminal identifier 426, and "1" is set as the profile identifier 423. Thus, the newly issued attribute certificate is held as the attribute certificate 705 in the attribute certificate list 720, the terminal identifier of the wireless terminal B is set as the issuing terminal group identifier 702, and "1" is set as a profile identifier.

The wireless terminal B adds a public key certificate of the wireless terminal B to the attribute-certificate-issuing terminal list 620. Here, in the issuing terminal group identifier 602 and the authentication group identifier 606, the terminal identifier of the wireless terminal B is set as a network identifier and "1" is set as a profile identifier.

The wireless terminal B transmits a registration acknowledgment (step 826). In this registration acknowledgment, the terminal identifier of the wireless terminal B is set as the network identifier 454, and "1" is set as the profile identifier 455. In addition, the public key certificate of the wireless terminal B is set as the issuing terminal public key certificate 458, and the attribute certificate issued from the wireless terminal B to the wireless terminal A is held as the attribute certificate 459.

The wireless terminal A receives the registration acknowledgment (step 815), adds the attribute certificate included in the registration acknowledgment to the attribute certificate list 710, and adds the public key certificate of the wireless terminal B to the attribute-certificate-issuing terminal list 610 (step 816). Here, in each of the issuing terminal group identifier 702, the issuing terminal group identifier 602, and the authentication group identifier 606 of the added entry, the terminal identifier of the wireless terminal B is set as a network identifier, and "1" indicated by the profile identifier 423 of the attribute certificate is set as a profile identifier.

Then, the wireless terminal B transmits a beacon to the wireless terminal A (step 827), and the wireless terminal A receives the beacon (step 817). Then, the wireless terminal A transmits a beacon to the wireless terminal B (step 818), and the wireless terminal B receives the beacon (step 828). Accordingly, the wireless terminal A understands the operation group identifier 433 of the wireless terminal B to perform mutual authentication (step 819), and the wireless terminal B understands the operation group identifier 433 of the wireless terminal A to perform mutual authentication (step 829).

Figure 18:
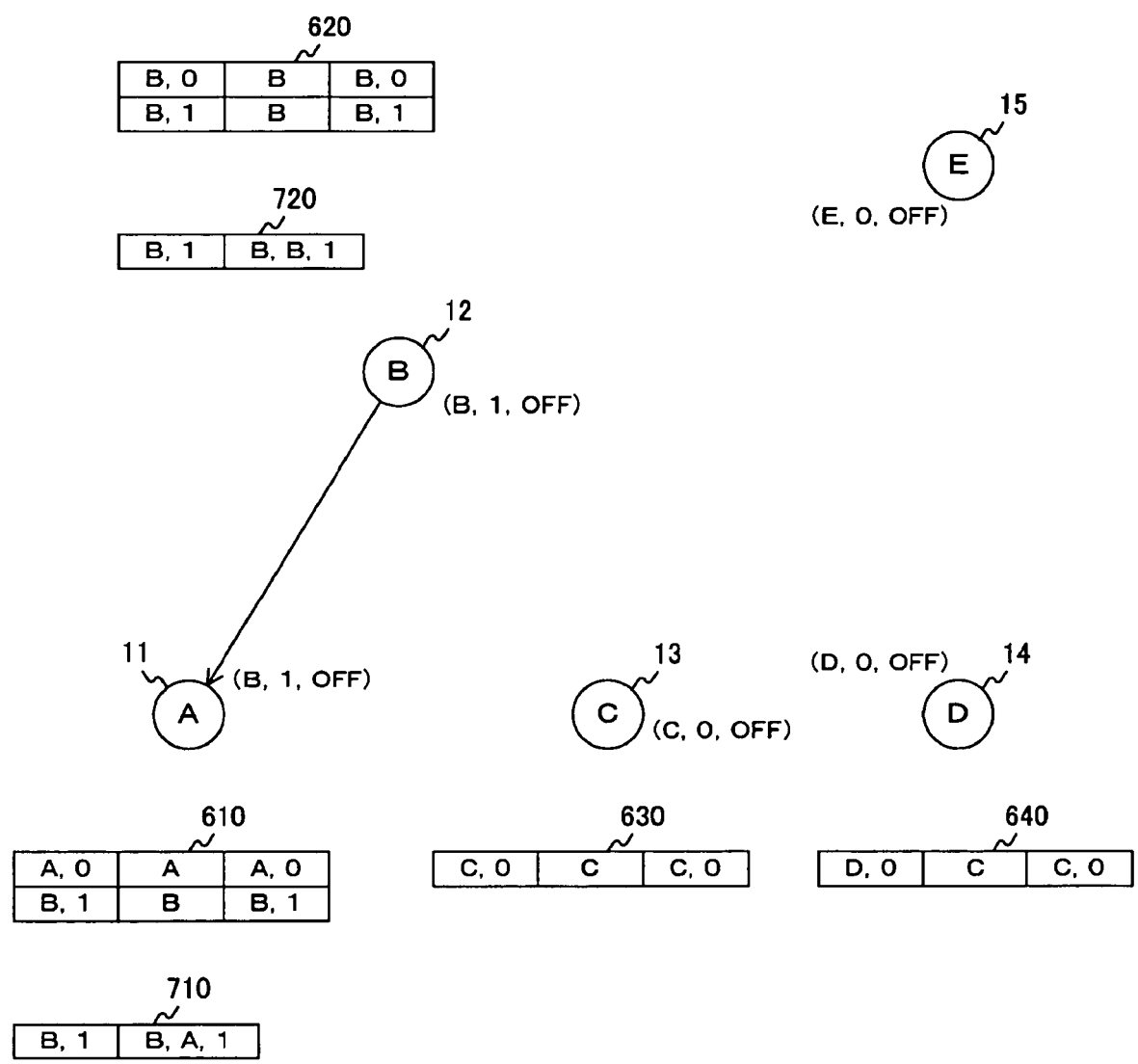
FIG. 18 shows an example of a second state of the wireless terminals in the embodiment.

FIG. 18 shows an example of a second state of the wireless terminals A to E after the process shown in FIG. 17 is performed in this embodiment. By the process shown in FIG. 17, information on the wireless terminal B is added as a new issuing terminal to the attribute-certificate-issuing terminal list 610 of the wireless terminal A. In addition, an attribute certificate issued from the wireless terminal B to the wireless terminal A is added to the attribute certificate list 710 of the wireless terminal A.

Information on the wireless terminal B as a new issuing terminal is added to the attribute-certificate-issuing terminal list 620 of the wireless terminal B. In addition, an attribute certificate issued from the wireless terminal B to the wireless terminal B itself is added to the attribute certificate list 720 of the wireless terminal B.

In the following examples, for example, the left column of the attribute certificate list 710 of the wireless terminal A represents the issuing terminal group identifier 702 of the attribute certificate list 700, and the right column of the attribute certificate list 710 represents the attribute certificate 705 of the attribute certificate list 700.

Figure 19:
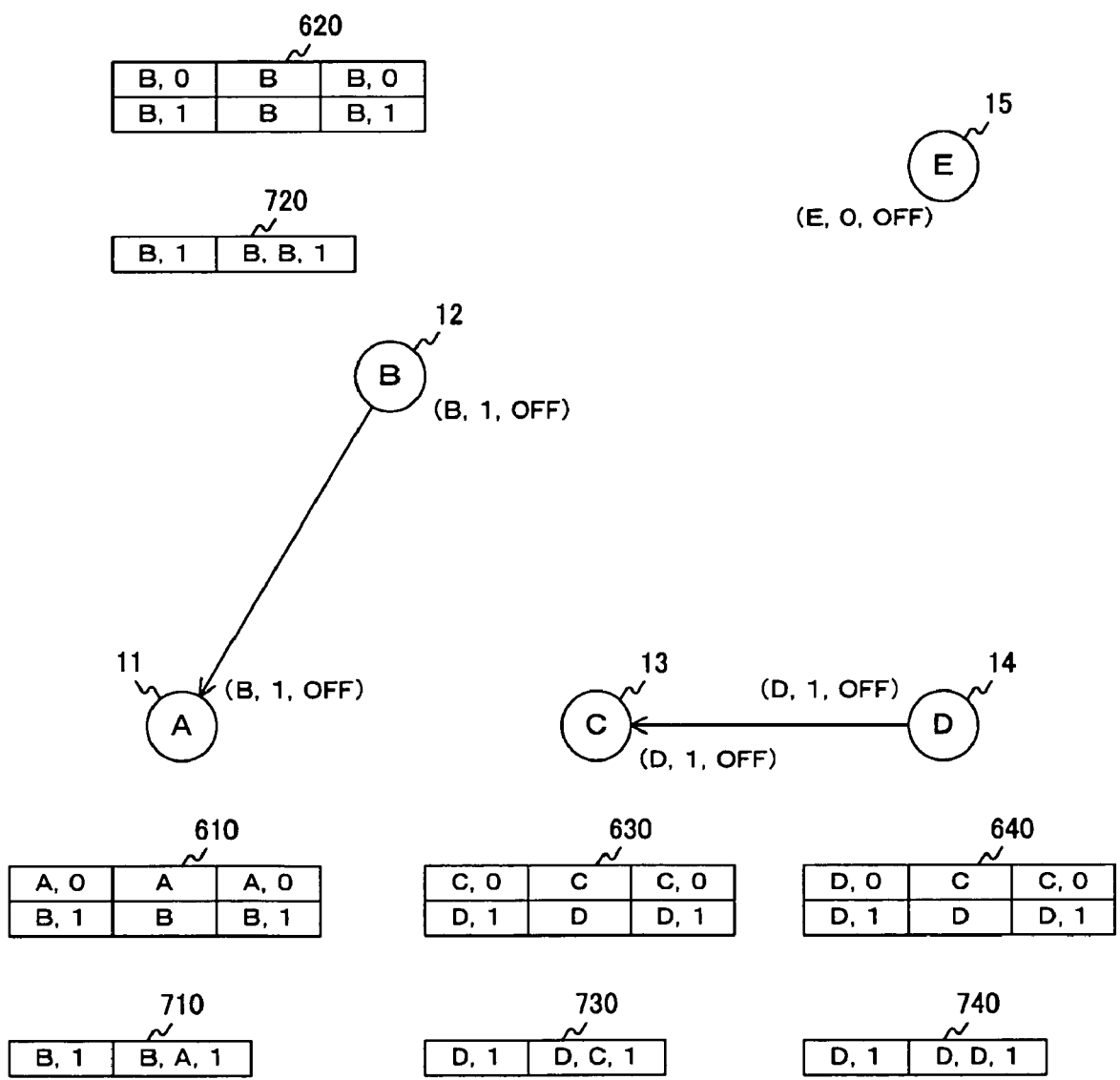
FIG. 19 shows an example of a third state of the wireless terminals in the embodiment.

FIG. 19 shows an example of a third state of the wireless terminals A to E in this embodiment. In the third state, mutual authentication is performed between the wireless terminals C and D in the second state shown in FIG. 18. Since processing performed in this case is similar to the processing until mutual authentication between the wireless terminals A and B, which is described above with reference to FIG. 17, the explanation of this processing is omitted here.

In the third state, information on the wireless terminal D as a new issuing terminal is added to an attribute-certificate-issuing terminal list 630 of the wireless terminal C. In addition, an attribute certificate issued from the wireless terminal D to the wireless terminal C is added to an attribute certificate list 730 of the wireless terminal C.

Information on the wireless terminal D as a new issuing terminal is added to an attribute-certificate-issuing terminal list 640 of the wireless terminal D. In addition, an attribute certificate issued from the wireless terminal D to the wireless terminal D itself is added to an attribute certificate list 740 of the wireless terminal D.

Figure 20:
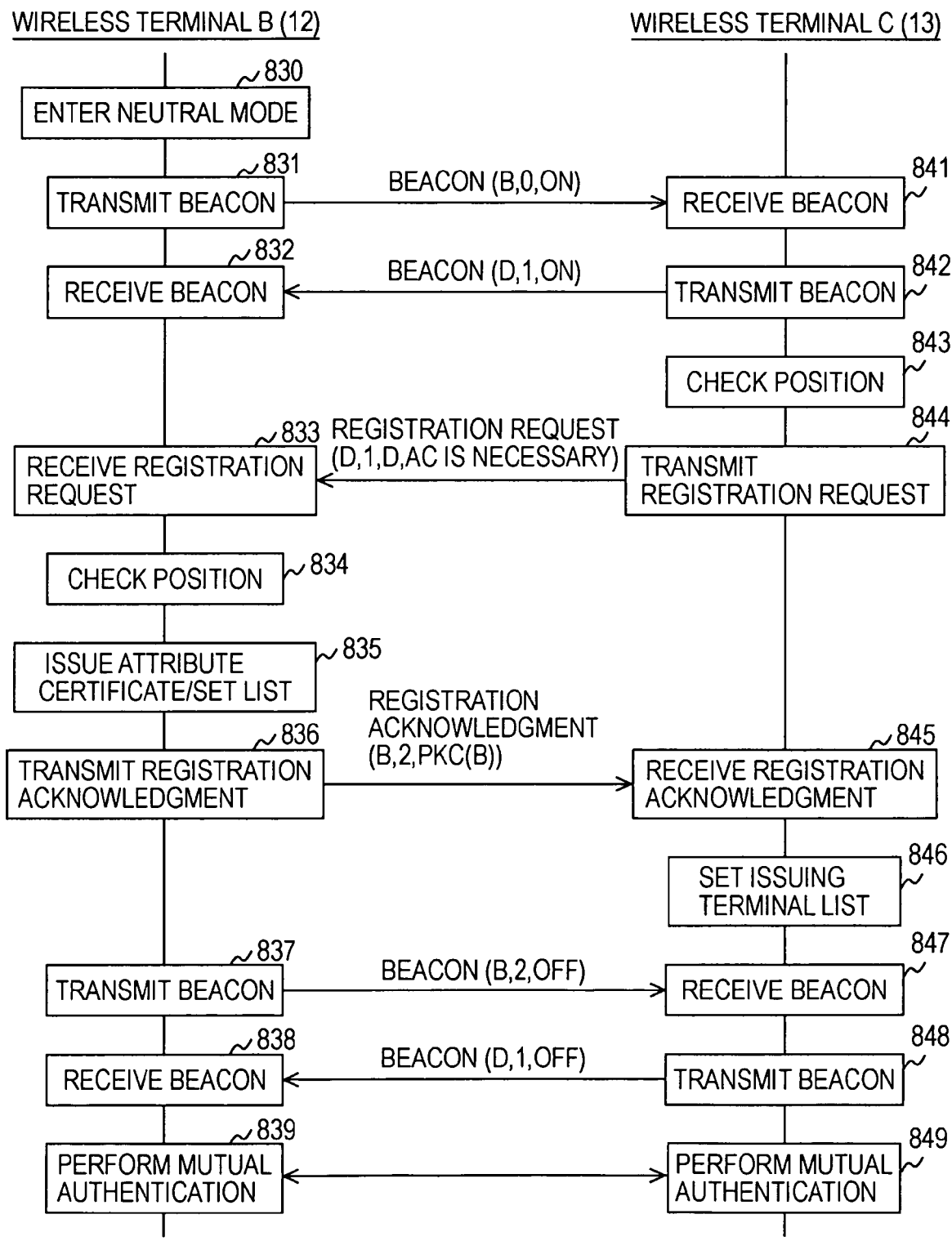
FIG. 20 is a sequence flow diagram showing a process until mutual authentication between wireless terminals in the third state in the wireless communication system in the embodiment.

FIG. 20 is a sequence flow diagram showing a process until mutual authentication performed by the wireless terminals B and C in the third state in the wireless communication system according to this embodiment. In the third state, which is described above with reference to FIG. 19, when a neutral button of the wireless terminal B is pressed, the wireless terminal B enters the neutral mode (step 830).

Then, the wireless terminal B transmits a beacon to the wireless terminal C (step 831), and the wireless terminal C receives the beacon (step 841). Then, the wireless terminal C transmits a beacon to the wireless terminal B (step 842), and the wireless terminal B receives the beacon (step 832). Here, the wireless terminal B sets the terminal identifier of the wireless terminal B as the network identifier 434, sets "0" as the profile identifier 435, and sets the registration operation mode as the registration operation mode 437. The wireless terminal C sets the terminal identifier of the wireless terminal D as the network identifier 434, sets "1" as the profile identifier 435, and sets the registration operation mode as the registration operation mode 437.

Since the wireless terminal C recognizes that the wireless terminal C entered the registration operation mode after transition of the wireless terminal B to the registration operation mode, the wireless terminal C serves as a requesting terminal. Thus, the wireless terminal C checks the position of the wireless terminal B (step 843). When the wireless terminal B is located within a defined range, the wireless terminal C transmits a registration request (step 844). In this registration request, the terminal identifier of the wireless terminal D is set as the network identifier 444, "1" is set as the profile identifier 445, and a public key certificate of the wireless terminal D is held as the issuing terminal public key certificate 448. Since the wireless terminal C holds an attribute certificate used for mutual authentication in this network group, information indicating that it is unnecessary to issue an attribute certificate is indicated by the attribute certificate issue necessity/unnecessity information 447.

The wireless terminal B receives the registration request (step 833), and checks the position of the wireless terminal C (step 834). Here, since information indicating that it is unnecessary to issue an attribute certificate is indicated by the attribute certificate issue necessity/unnecessity information 447 of the registration request, the wireless terminal B issues an attribute certificate used for this network group only to the wireless terminal B itself (step 835). In this attribute certificate, the terminal identifier of the wireless terminal B is set as the issuing terminal identifier 424 and the owner terminal identifier 426, and the newly generated value "2" is set as the profile identifier 423. As a result, in the attribute certificate list 720, the newly issued attribute certificate is held as the attribute certificate 705, the terminal identifier of the wireless terminal B is set as the issuing terminal group identifier 702, and "2" is set as a profile identifier.

In addition, the wireless terminal B adds a public key certificate of the wireless terminal B itself to the attribute-certificate-issuing terminal list 620. Here, in the issuing terminal group identifier 602 and the authentication group identifier 606, the terminal identifier of the wireless terminal B is set as a network identifier, and "2" is set as a profile identifier. In addition, the issuing terminal group identifier 443 and the issuing terminal public key certificate 448 included in the registration request are added to the attribute-certificate-issuing terminal list 620. Here, in the authentication group identifier 606, the terminal identifier of the wireless terminal B is set as a network identifier, and "2" is set as a profile identifier.

The wireless terminal B transmits a registration acknowledgment (step 836). In this registration acknowledgment, the terminal identifier of the wireless terminal B is set as the network identifier 454, "2" is set as the profile identifier 455, and a public key certificate of the wireless terminal B is held as the issuing terminal public key certificate 458. However, nothing is held as the attribute certificate 459.

The wireless terminal C receives the registration acknowledgment (step 845), and adds the public key certificate of the wireless terminal B included in the registration acknowledgment to the attribute-certificate-issuing terminal list 630 (step 846). Here, in the issuing terminal group identifier 602 of the added entry, the terminal identifier of the wireless terminal B is set as a network identifier, and "2" indicated by the profile identifier 423 of the attribute certificate is set as a profile identifier. In addition, a group identifier currently being used (held in the operation group identifier holder 130) is set as the authentication group identifier 606. That is, the terminal identifier of the wireless terminal D is set as a network identifier, and "1" is set as a profile identifier.

Then, the wireless terminal B transmits a beacon to the wireless terminal C (step 837), and the wireless terminal C receives the beacon (step 847). The wireless terminal C transmits a beacon to the wireless terminal B (step 848), and the wireless terminal B receives the beacon (step 838). The wireless terminal B understands the operation group identifier 433 of the wireless terminal C to perform mutual authentication (step 839), and the wireless terminal C understands the operation group identifier 433 of the wireless terminal B to perform mutual authentication (step 849). Since the wireless terminal B serves as a new attribute-certificate-issuing terminal, after mutual authentication is performed, the wireless terminal B broadcasts to the entire network group the public key certificate of the wireless terminal B and a group identifier when the wireless terminal B came to serve as the issuing terminal. In this group identifier, the terminal identifier of the wireless terminal B is set as a network identifier, and "2" is set as a profile identifier. The wireless terminal D receives the public key certificate and the group identifier broadcasted by the wireless terminal B, and adds the public key certificate and the group identifier to the attribute-certificate-issuing terminal list 640. Here, the group identifier currently being used (held in the operation group identifier holder 130) is set as the authentication group identifier 606. That is, the terminal identifier of the wireless terminal D is set as a network identifier, and "1" is set as a profile identifier.

Figure 21:
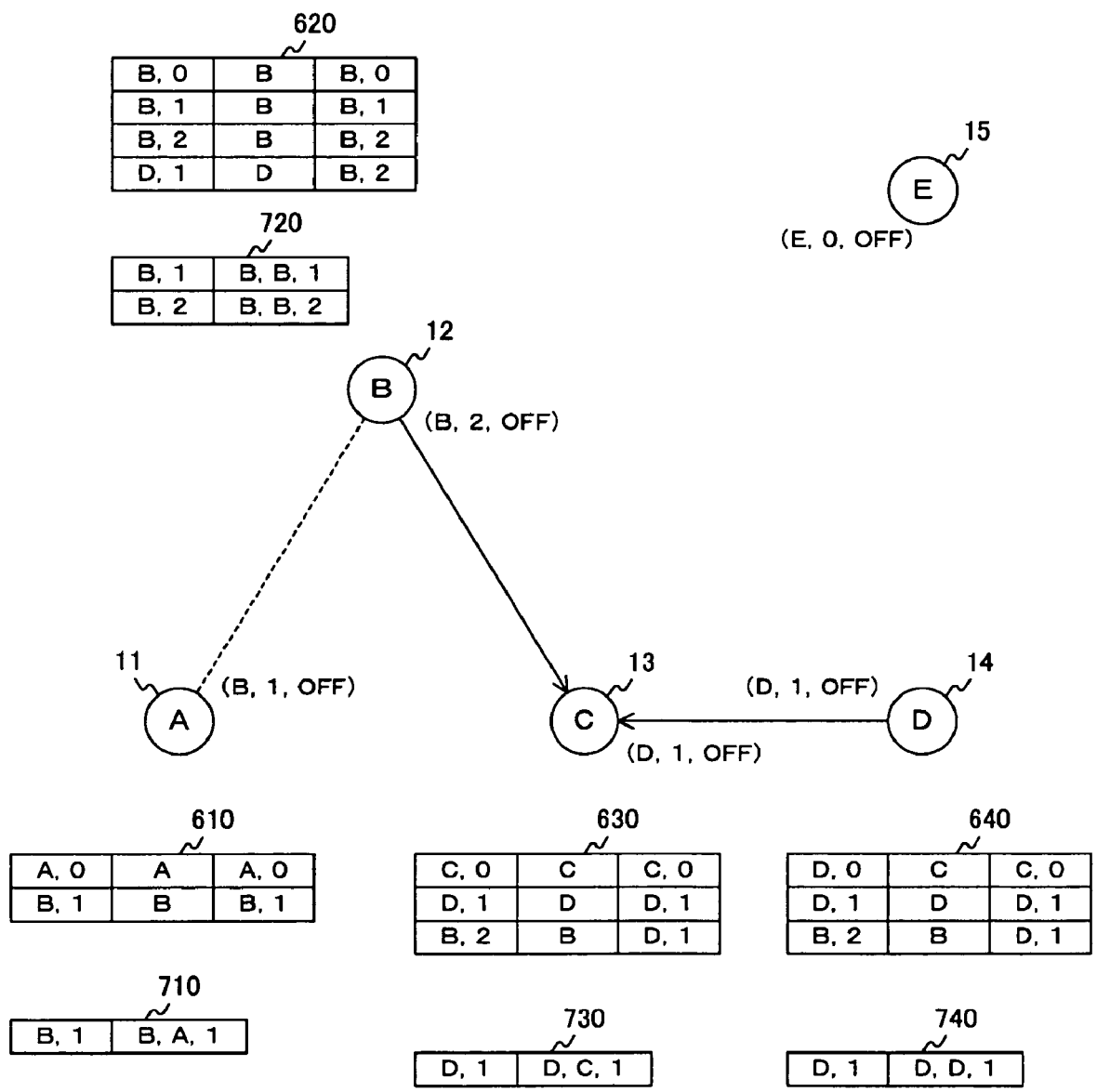
FIG. 21 shows an example of a fourth state of the wireless terminals in the embodiment.

FIG. 21 shows an example of a fourth state of the wireless terminals A to E in this embodiment. In the fourth state, mutual authentication is performed between the wireless terminals B and C in the third state shown in FIG. 19.

In the fourth state, information on the wireless terminals B and D as new issuing terminals is added to the attribute-certificate-issuing terminal list 620 of the wireless terminal B. In addition, an attribute certificate issued from the wireless terminal B to the wireless terminal B itself is added to the attribute certificate list 720 of the wireless terminal B. In addition, information on the wireless terminal B as a new issuing terminal is added to the attribute-certificate-issuing terminal list 630 of the wireless terminal C and the attribute-certificate-issuing terminal list 640 of the wireless terminal D.

As described above, in this embodiment, a group identifier held in the operation group identifier holder 130 is used. Thus, group-aware network identification can be performed. A group identifier used in this embodiment is acquired by adding a profile identifier managed by the profile identifier counter 120 to a known network identifier.

In the foregoing embodiment, one of two wireless terminals that enters a registration operation mode after transition of the other one of the two wireless terminals to the registration operation mode transmits a registration request, and the other one of the two wireless terminals that receives the registration request issues an attribute certificate. However, the present invention is not limited to this. One of two wireless terminals that first enters the registration operation mode may transmit a registration request, and the other one of the two wireless terminals that receives the registration request may issue an attribute certificate.

The foregoing embodiments are merely examples. Although the correspondence between features of claims and embodiments is described below, the present invention is not limited to the foregoing embodiments. Various changes can be made to the present invention without departing from the scope of the present invention.

That is, according to each embodiment of the present invention, a terminal identifier of an issuing terminal corresponds to, for example, a network identifier. In addition, a first identifier corresponds to, for example, a profile identifier.

According to an embodiment of the present invention, an operation group identifier holder corresponds to, for example, the operation group identifier holder 130. In addition, a report signal generator corresponds to, for example, the beacon generator 160. In addition, a report signal transmitter corresponds to, for example, the communication unit 170.

According to another embodiment of the present invention, a report signal receiver corresponds to, for example, the communication unit 170. In addition, a registration processor corresponds to, for example, the registration processor 110.

According to another embodiment of the present invention, an operation receiver corresponds to, for example, the operation receiving unit 140. In addition, a resetting unit corresponds to, for example, the neutral mode transition unit 150.

According to another embodiment of the present invention, an identifier managing unit corresponds to, for example, the profile identifier counter 120. In addition, a registration processor corresponds to, for example, the registration processor 110.

According to another embodiment of the present invention, processing for holding, by a terminal, as an operation group identifier of the terminal, a group identifier including a terminal identifier of an issuing terminal that issues an attribute certificate and a first identifier that is set for the issuing terminal corresponds to, for example, the processing of step S920. In addition, processing for generating a report signal including the operation group identifier corresponds to, for example, the processing of step S901. In addition, processing for transmitting the report signal corresponds to, for example, the processing of step S902.

The processing steps described in the foregoing embodiments may be regarded as being a method including the processing steps. Alternatively, the processing steps may be regarded as being a program for causing a computer to execute the processing steps or may be regarded as being a recording medium that stores the program.

It should be understood by those skilled in the art that various modifications, combinations, sub-combinations and alterations may occur depending on design requirements and other factors insofar as they are within the scope of the appended claims or the equivalents thereof.

What is claimed is:

1. A first terminal, comprising:
a memory storing a first ID identifying a first wireless network group to which the first terminal is connected;
a beacon generator for generating a first beacon indicating the first ID and operation mode information of the first terminal;
a transmitter for transmitting the first beacon;
a receiver for receiving a second beacon from the second terminal, the second beacon indicating a second ID identifying a second wireless network group to which the second terminal is connected, and operation mode information of the second terminal; and
a registration processor configured to:
determine, based on the operation mode information of the first and second terminals, whether the first terminal enters a registration operation mode before the second terminal enters the registration operation mode;
when it is determined that the first terminal enters the registration operation mode before the second terminal enters the registration operation mode, transmit to the second terminal an attribute certificate for joining the first wireless network group; and
when it is determined that the second terminal enters the registration mode before the first terminal enters the registration mode, transmit to the second terminal a request for registration on the second wireless network group.

2. The first terminal according to claim 1,
wherein the registration processor is further configured to:
determine whether the second terminal is within a distance range of the first terminal; and
transmit the attribute certificate for joining the first network to the second terminal only when the second terminal is determined to be within the distance range of the first terminal.

3. The first terminal according to claim 1,
wherein the registration processor is further configured to:
determine whether the second terminal is within a distance range of the first terminal; and
transmit the registration request to the second terminal only when the second terminal is determined to be within the distance range of the first terminal.

4. The first terminal according to claim 3, wherein the registration request includes information indicating whether the first terminal has an attribute certificate issued by the second terminal for accessing the second wireless network group.

5. The first terminal according to claim 3, further comprising a counter that increments when a registration acknowledgment is received from the second terminal.

6. The first terminal according to claim 1, further comprising:
   an input device for receiving an instruction to disconnect from a wireless network; and
   resetting means for resetting the wireless network group ID stored in memory when the instruction to disconnect is received.

7. The first terminal according to claim 6, wherein the input device includes a button.

8. A computer-implemented method for connecting a first terminal to second terminal, comprising:
   storing in memory a first ID of a first wireless network group to which the first terminal is connected;
   generating a first beacon indicating the first ID and operation mode information of the first terminal;
   transmitting the first beacon;
   receiving a second beacon from the second terminal, the second beacon indicating a second ID identifying a second wireless network group to which the second terminal is connected, and operation mode information of the second terminal;
   determining, based on the operation mode information of the first and second terminals, whether the first terminal enters a registration operation mode before the second terminal enters the registration operation mode;
   when it is determined that the first terminal enters the registration operation mode before the second terminal enters the registration operation mode, transmitting to the second terminal an attribute certificate for joining the first wireless network group; and
   when it is determined that the second terminal enters the registration mode before the first terminal enters the registration mode, transmit to the second terminal a request for registration on the second wireless network group.

9. A computer-readable storage medium storing a program which, when executed by a first terminal, causes the first terminal to perform a method for connecting to a second terminal, the method comprising:
   storing in memory a first ID of the first wireless network group to which the first terminal is connected;
   generating a first beacon indicating the first ID and operation mode information of the first terminal;
   transmitting the first beacon;
   receiving a second beacon from the second terminal, the second beacon indicating a second ID identifying a second wireless network group to which the second terminal is connected, and operation mode information of the second terminal;
   determining, based on the operation mode information of the first and second terminals, whether the first terminal enters a registration operation mode before the second terminal enters the registration operation mode;
   when it is determined that the first terminal enters the registration operation mode before the second terminal enters the registration operation mode, transmitting to the second terminal an attribute certificate for joining the first wireless network group; and
   when it is determined that the second terminal enters the registration mode before the first terminal enters the registration mode, transmit to the second terminal a request for registration on the second wireless network group.

10. A first communication terminal configured to connect to a second communication terminal, comprising:
    a memory storing:
       a list of certificates granting access to different wireless network groups,
       corresponding IDs of trusted issuing terminals that issue the certificates for accessing the different wireless network groups, and
       an ID of a wireless network group to which the first terminal is connected;
    a communication unit for receiving a beacon from the second terminal, the beacon indicating an ID of a wireless network group to which the second terminal is connected; and
    a processor for:
       retrieving, from the list of certificates based on the wireless network group ID indicated in the beacon, a corresponding ID of a trusted issuing terminal that issues certificates for accessing the wireless network group to which the second terminal is connected;
       determining whether the stored ID of the wireless network group to which the first terminal is connected corresponds to the retrieved ID of the trusted issuing terminal; and
       based on whether it is determined that the stored ID of the wireless network group to which the first terminal is connected corresponds to the retrieved ID of the trusted issuing terminal, performing an authentication process with the first second terminal.

* * * * *

UNITED STATES PATENT AND TRADEMARK OFFICE
CERTIFICATE OF CORRECTION

| | |
|---|---|
| PATENT NO. | : 7,756,476 B2 |
| APPLICATION NO. | : 11/500388 |
| DATED | : July 13, 2010 |
| INVENTOR(S) | : Hideyuki Suzuki |

It is certified that error appears in the above-identified patent and that said Letters Patent is hereby corrected as shown below:

In the Claims:

In claim 10, column 22, line 47, "with the first second terminal." should read --with the second terminal.--.

Signed and Sealed this

Twenty-first Day of September, 2010

David J. Kappos
*Director of the United States Patent and Trademark Office*